ELECTRONIC REGISTER TRANSLATOR

Inventors,
Kenneth M. Heron
Howard Baker & Daniel L. Benson,
by Hall & Houghton
Attorneys.

ELECTRONIC REGISTER TRANSLATOR

Filed Jan. 29, 1951 19 Sheets-Sheet 2

Inventors,
Kenneth M. Heron,
Howard Baller & David L. Benson,
by Hall & Houghton,
Attorneys.

ELECTRONIC REGISTER TRANSLATOR

Inventors,
Kenneth M. Heron,
Howard Baker & David L. Benson,
by Hall & Houghton
Attorneys Inventors,
Kenneth M. Heron
Howard Baker, & David L. Benson,
by Hall & Houghton
Attorneys.

Inventors,
Kenneth M. Heron,
Howard Baker & David L. Benson,
by Hall & Houghton,
Attorneys.

Dec. 18, 1956 K. M. HERON ET AL 2,774,818

ELECTRONIC REGISTER TRANSLATOR

Filed Jan. 29, 1951 19 Sheets-Sheet 6

Inventors,
Kenneth M. Heron,
Howard Baker & David L. Benson,
by Hall & Houghton
Attorneys.

Inventors,
Kenneth M. Heron
Howard Baker & David L. Benson
by Hall & Houghton
Attorneys.

Inventors,
Kenneth M. Heron,
Howard Baker, &
David L. Benson,
by Haller Houghton
Attorneys.

Inventors,
Kenneth M. Heron,
Howard Baker, &
David L. Denson,
by Hall & Houghton
Attorneys.

ELECTRONIC REGISTER TRANSLATOR

Inventors,
Kenneth M. Heron,
Howard Baker & David L. Benson
by Hall & Houghton,
Attorneys.

Inventors,
Kenneth M. Heron
Howard Baker, &
David L. Benson,
by Hall & Houghton
Attorneys.

Dec. 18, 1956 K. M. HERON ET AL 2,774,818

ELECTRONIC REGISTER TRANSLATOR

Filed Jan. 29, 1951 19 Sheets-Sheet 12

Inventors,
Kenneth M. Heron
Howard Baker, &
David L. Benson,
by Hall & Houghton
Attorneys.

FIG. 14. COMPONENT PULSES SWITCHING & OUT PUT

Inventors,
Kenneth M. Heron,
Howard Baker, &
David L. Benson,
by Hall & Houghton
Attorneys.

Dec. 18, 1956 K. M. HERON ET AL 2,774,818

ELECTRONIC REGISTER TRANSLATOR

Filed Jan. 29, 1951 19 Sheets-Sheet 14

Inventors,
Kenneth M. Heron,
Howard Baker, &
David L. Benson,
by Hall & Houghton
Attorneys.

Inventors,
Kenneth M. Heron,
Howard Baker, &
David L. Benson,
by Hall & Houghton
Attorneys.

FIG. 18. (COMPONENT FIELD)

Inventors,
Kenneth M. Heron,
Howard Baker, & David L. Benson,
by Hall & Houghton
Attorneys.

Inventors,
Kenneth M. Heron,
Howard Baker, &
David L. Benson,
by Hall & Houghton,
Attorneys.

Dec. 18, 1956 K. M. HERON ET AL 2,774,818

ELECTRONIC REGISTER TRANSLATOR

Filed Jan. 29, 1951 19 Sheets-Sheet 18

KENNETH M. HERON,
HOWARD BAKER,
DAVID L. BENSON,
INVENTORS

BY Hall & Houghton
ATTORNEY

Dec. 18, 1956 K. M. HERON ET AL 2,774,818

ELECTRONIC REGISTER TRANSLATOR

Filed Jan. 29, 1951 19 Sheets-Sheet 19

KENNETH M. HERON,
HOWARD BAKER,
DAVID L. BENSON,

INVENTOR

BY Hall + Houghton

ATTORNEY

United States Patent Office 2,774,818

Patented Dec. 18, 1956

2,774,818

ELECTRONIC REGISTER TRANSLATOR

Kenneth Malcolm Heron, London, and Howard Baker and David Livingstone Benson, Surrey County, England Application January 29, 1951, Serial No. 208,284

14 Claims. (Cl. 179—18)

This invention relates to apparatus of the kind which is arranged to provide desired information from stored information by correlating the stored information with received stimuli.

An example of such apparatus is to be found in calculating or computing apparatus in which a stimulus in the form of the argument of a mathematical function is applied to the apparatus for the purpose of automatically calculating the value of the function which corresponds to the particular argument.

A further example of such apparatus is to be found in automatic or semi-automatic telephone systems in the form of register-translators to which a stimulus consisting in a code by which an exchange or desired service is identified, is applied and which, on receipt of the stimulus, correlates items of information already stored therein with the code in such a manner as to emit, for example, the necessary switch settings designated by the code, the charge for a connection or service and the number of numerical digits which should follow the code.

Figure 2:
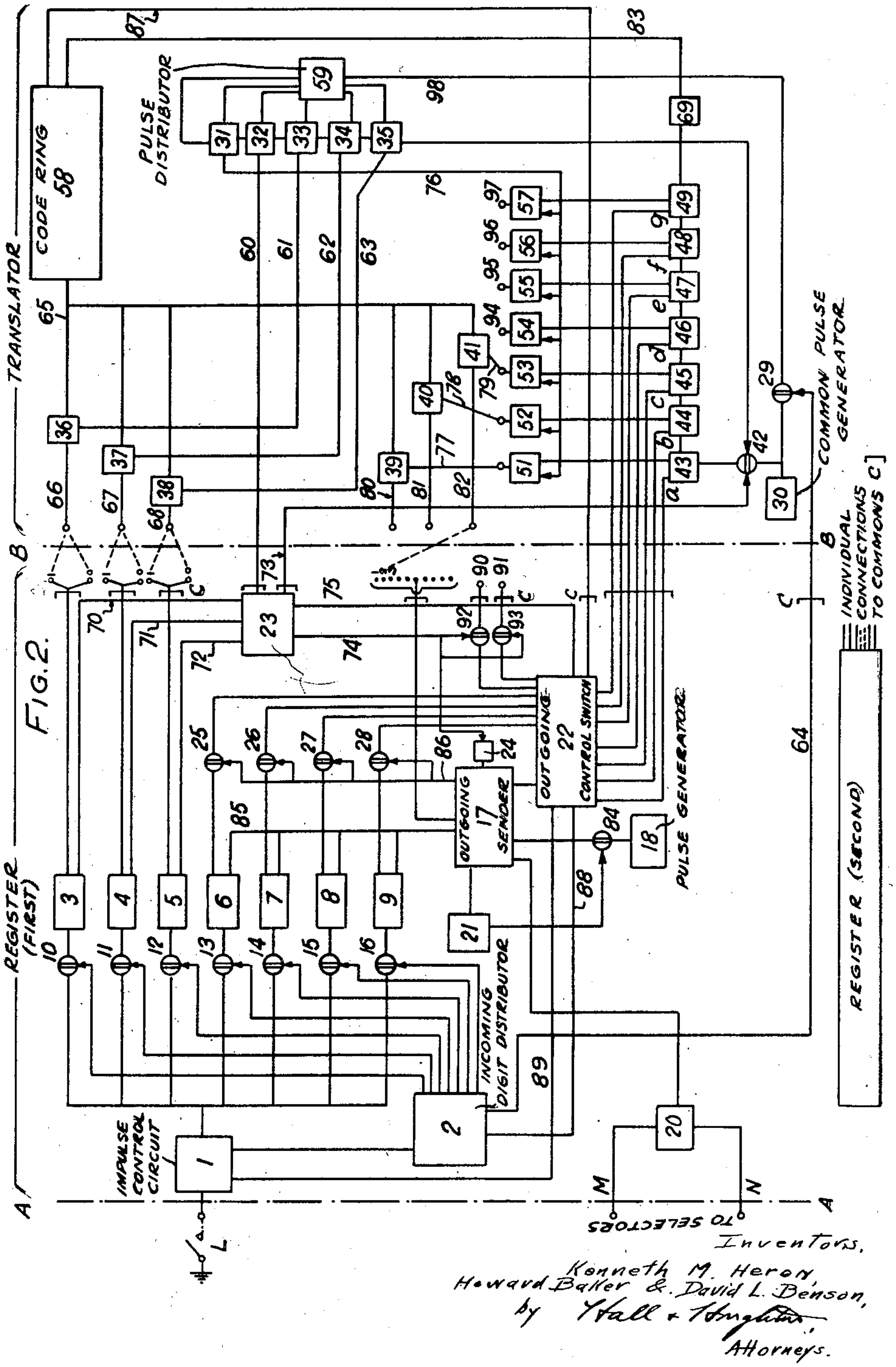

As the subject matter is fairly complicated, the following specification is provided with headnotes to facilitate cross reference, which headnotes are here collected to form an index to the specification:

I. Objects and general comments.
II. Drawings.
III. Conventions.
IV. General arrangement (Fig. 2).
  (*a*) Engaging and code digit reception.
  (*b*) Identifying code digit translations.
  (*c*) Sending translation digits.
  (*d*) Sending stored number digits.

Turning now to these subjects in order:

I. OBJECTS AND GENERAL COMMENTS

An object of the present invention is to provide improved register-translator equipment for use in automatic or semi-automatic exchanges by the use of electronic techniques with resulting greater reliability in operation and reduction of maintenance costs.

It is well known that the function of the register-translator is to receive all or part of the exchange code and the called subscribers number as dialled by a caller and to change all or part of the dialled-in digits into another signal or series of signals which are best adapted to route the call towards its final destination. Register-translator equipment at present in use translates the code portion of the called number into signals which direct the call to the wanted exchange or service or advance the call to a point in the telephone network where further register-translator means are enabled to advance the call still further towards its destination. The numerical portion of the called number is not, in general, translated, and is stored by the register until such time as the code translation has advanced the call to the required exchange.

Known register-translator apparatus for automatic or semi-automatic telephone systems consist of three parts.

The first part, called the register receives and stores the dialled information, while the second, the translator, commonly takes the form of a cross-connection field of wires which form a permanent memory of the information defining the route, and in some cases the charge for each code which may be dialled. The third part is a sender or counting circuit, which accepts information from the translator or from the numerical storage circuits and controls the setting of subsidiary apparatus in accordance with the information received for sending.

The high level of traffic which has to be handled by automatic telephone exchanges results in heavy loading of common equipment such as register translators and it is a further object of the present invention to improve the reliability of such common equipment by utilisation of electronic techniques with resulting economy of components, and a lowering of maintenance costs.

According to the present invention automatic telephone exchange equipment or the like having two or more registers is provided with a single translator which serves as a permanent reference memory of all the items of information relating to all the codes for which its associated registers may require information and contains means whereby the said items of information may be offered sequentially to the registers and sent only to such registers as require the information and whose circuits are in such a condition as to receive only the required items of information.

Further according to the present invention automatic or semi-automatic telephone systems having two or more registers are provided with a single translator which is common to the registers and which comprises information recording means providing a permanent record of said information and adapted to produce continuously or on demand a series of electric signals each of which represents an item of the information and further means for successively reproducing the various items of said information as electric signals which are received and stored by the register only during such part of each cycle of transmission of signals by the said further means as is determined by the condition of the register consequent on the reception thereby of signals produced other than by the translator, i. e., calling signals.

It is known in register translators for applications for translations to be made to the translator after fixed numbers of complete digits have been received and stored in the register. It is a feature of this invention that such applications may be made after the storage in the register of each or any of the incoming digits. The common tranlsator preferably is capable of signalling information to two or more registers simultaneously.

In particular equipment according to the invention and relating to register-translators for use in automatic or semi-automatic telephone exchanges the register includes electronic storage elements for the storage of the information comprising the codes and numerical information defining the exchange and number or the service required by the caller. Each storage element relating to the codes is joined over commoned wires to corresponding elements in other registers and to a common translator. Each register is further connected by means of commoned control wires to the single translator.

It is a feature of the invention that the translator comprises a pulse generating and a pulse distributing circuit the two circuits cooperating to control electronic circuit elements corresponding in number to the working codes available to the registers associated with the translator. These elements which will be designated collectively hereafter as the code ring are operated on in such a manner that each item of information indicated by a connection in a cross connection field representing code and translation permanent information is normally offered in a predetermined sequence to all the registers associated with the translator and compared with the information stored in the code storage elements of the register.

It is a further feature of the invention that the individual items of information relating to a particular code are offered serially to the registers in the form of a predetermined timed sequence of spaced pulses known hereafter as the translation cycle and occurring after the comparison between the translator code ring and the register code storage has been sought but before the next element of the code ring has been caused to be compared with the code storage in the registers.

It is a further feature of the invention that each comparison of the code ring of the translator with the codes stored in the registers is spaced from the next by synchronising pulses.

Further according to the invention the registers are enabled over commoned wires to signal to the translator that the code for which they require information has been offered to them and that a particular item of information regarding that code is sought before the translator code ring is caused to offer to the registers information regarding a new code. According to the invention when the translator is signalled in this manner the movement of the code ring may be temporarily inhibited and the translator enabled to signal to the register the particular item of information sought, means being provided for a plurality of registers simultaneously seeking the same information to be given the information at the same time. It is further arranged that any register or registers requiring items of information relating to the code for which information is being sent by the translator may, providing the items of information required are normally offered by the translator at the same or a later time in the translation cycle, be given the information before another element of the code ring is selected.

II. DRAWINGS

Figure 1:
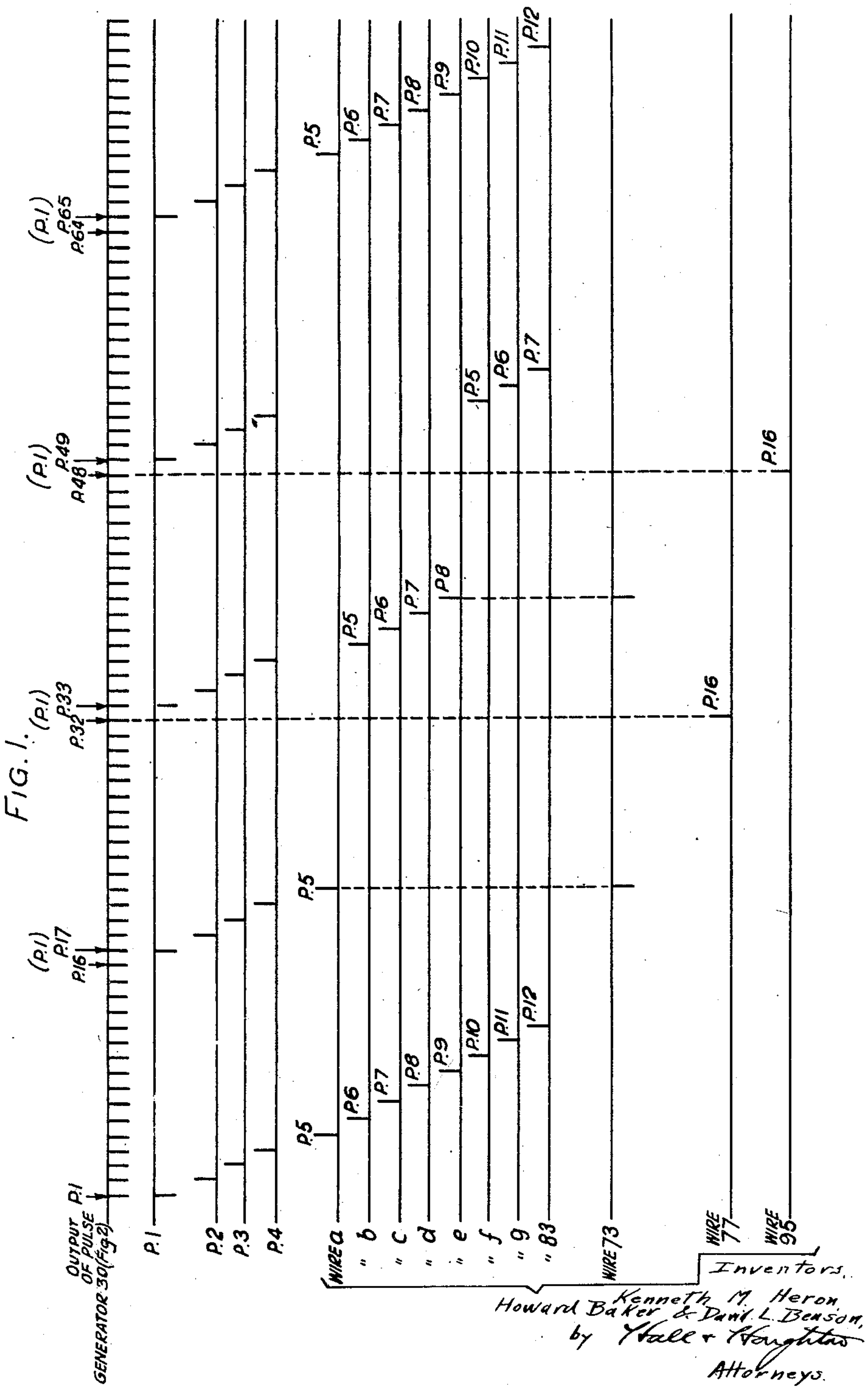

In order that the invention may be more clearly understood and readily carried into effect, a register translator system designed to operate in accordance therewith will now be described in greater detail by way of example with reference to the accompanying drawings in which:

Fig. 1 is a pulse timing chart showing the time relationship between the various groups of pulses used in the operation of the system, Fig. 2 is a functional schematic diagram representing the major items of apparatus forming a register-translator for handling three code digits requiring translation, and four numerical digits.

Figure 19:
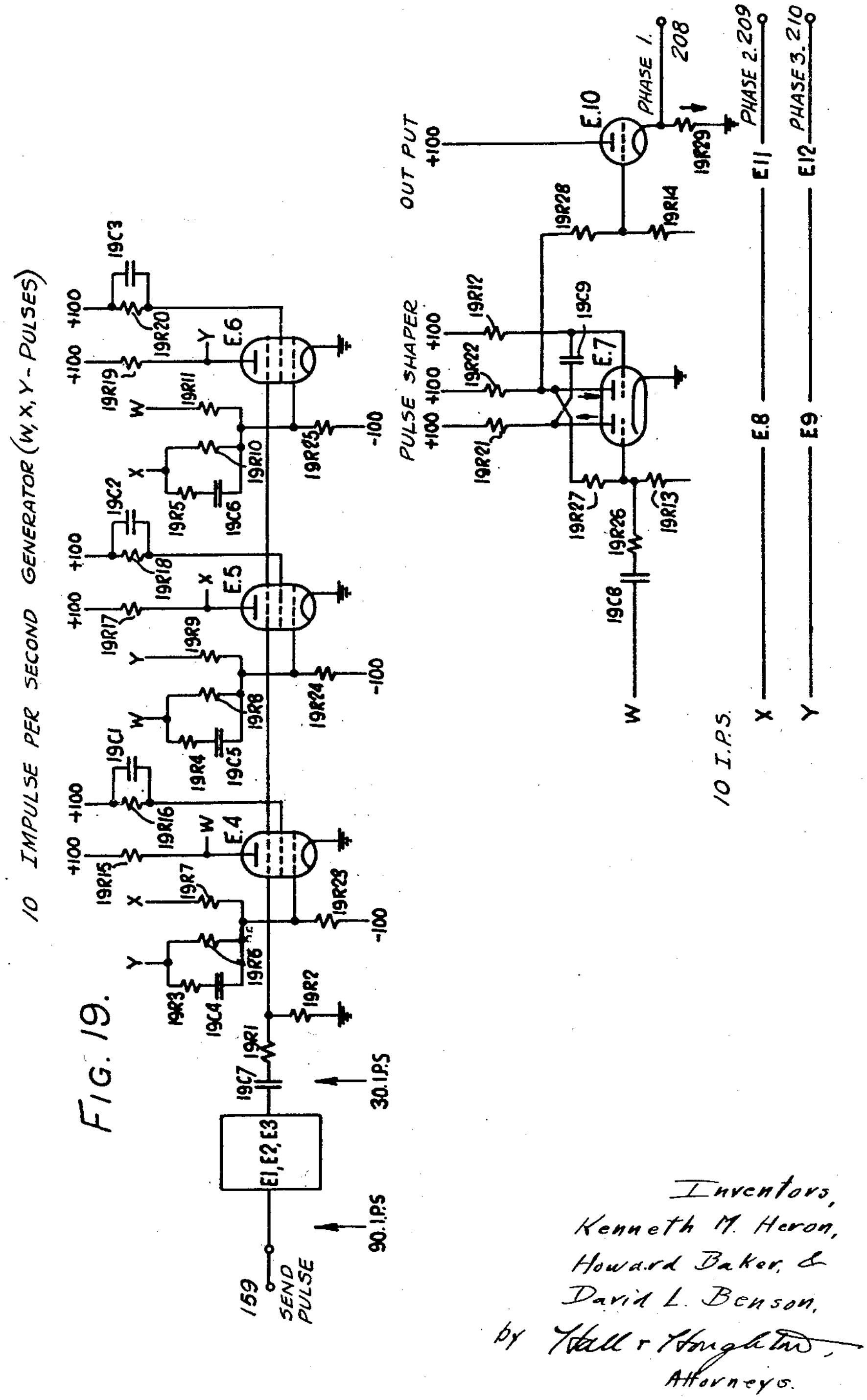
Figure 20:
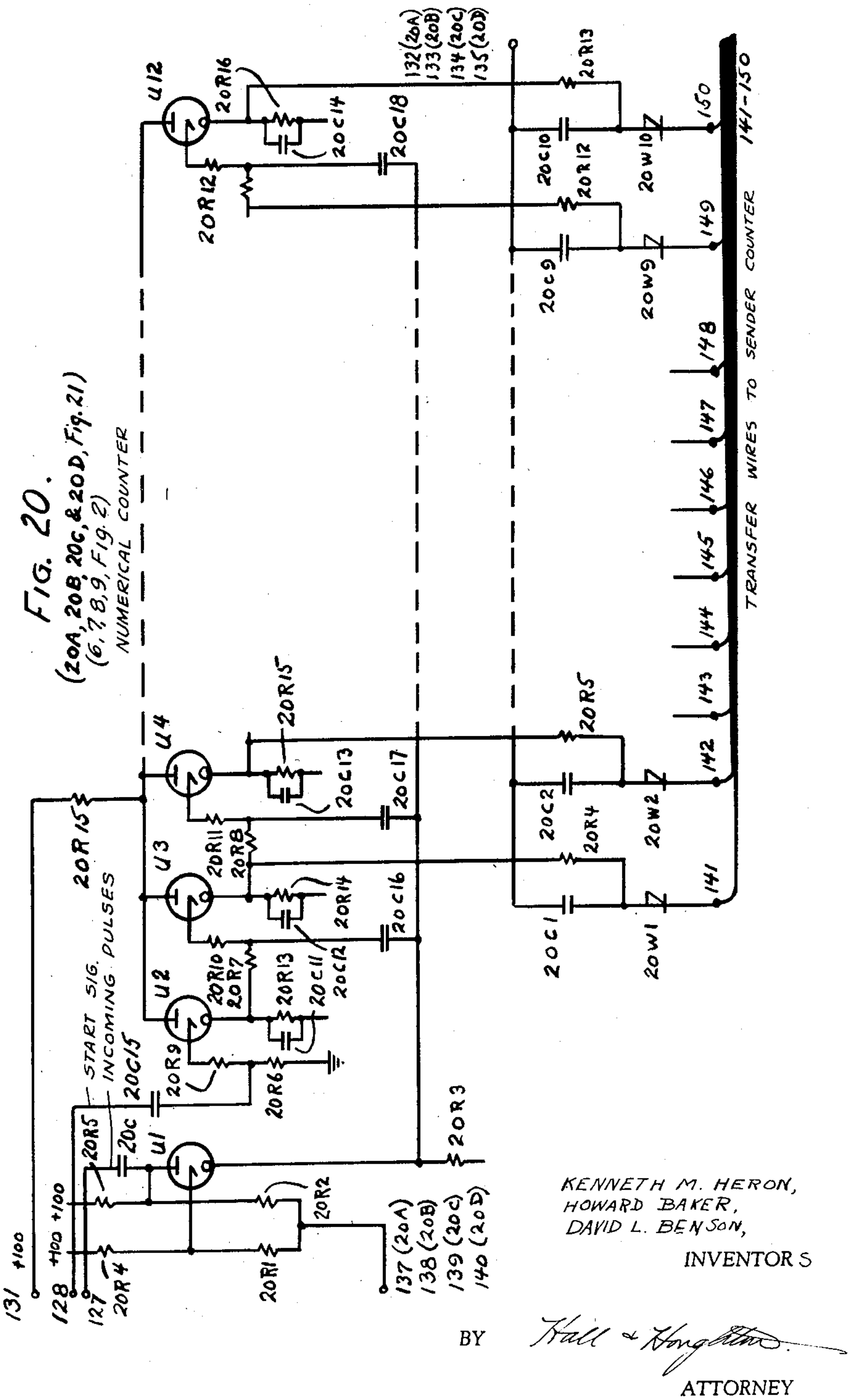
Figure 21:
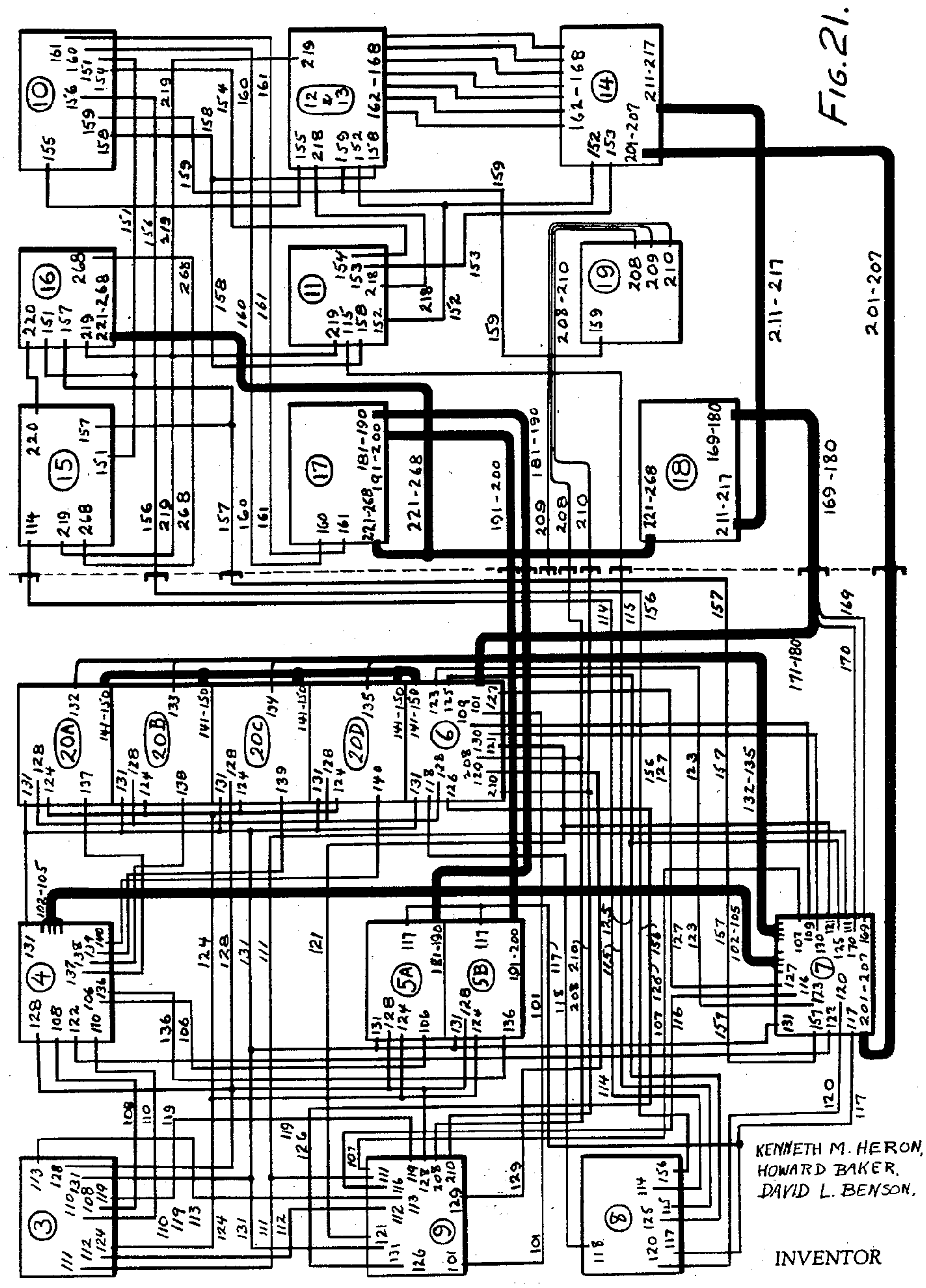

Figs. 3 to 9 inclusive show circuit details of a register, and Figs. 10 to 20 inclusive show circuit details of a translator, designed to function in accordance with the principles embodied in the arrangement of Fig. 2 but adapted for use in a system where only two code digits are required to be translated, while Fig. 21 is a block diagram showing the interconnections between Figs. 3 through 20.

III. CONVENTIONS

Where it is desired to indicate connections between different figures of the drawings the leads are appropriately annotated and in order to facilitate the tracing of connections between figures, the routing of the leads is shown in Fig. 21 and listed in a schedule at the end of the present specification. Where double triode valves are shown, the two triode elements are identified by the same reference and in the specification, grid (L) and grid (R) refer to the left-hand and right-hand grid respectively of a double triode valve. Similarly anode (L) and anode (R) will refer to the left and right hand anodes respectively of a double triode valve.

GENERAL ARRANGEMENT (FIG. 2)

The general arrangement of the various cooperating parts of the equipment will first be described with reference to Fig. 2 of the drawings in which a first register is shown in block schematic form between the chain dotted lines A—A, B—B, together with a second register represented by a single block and a common translator as shown in block schematic form to the right of the chain dotted line B—B. All registers have common connections to the translator as represented by the common sign C. For the purpose of describing the application of the invention in the general arrangement, it is assumed that the information supplied to the register is either in the form of three code digits signifying the required exchange followed by four numerical digits denoting the wanted subscriber's number in that exchange or consists of a one, two or three digit code not followed by a subscriber's number and indicating a special service as, for example, operator assistance, it being understood that this is an example only and that the invention is equally applicable to other number arrangements. The signals received by the register may take the form of trains of dialled impulses or coded key pulses or any signal which may be appropriate to the system in which the registers are used.

(a) *Engaging and code digit reception*

For the purpose of explaining the invention it will be assumed that loop-disconnect impulses from a telephone dial are caused to be repeated by a relay contact into the impulse accepting and release control circuit 1 in Fig. 2 in a manner well known to those skilled in the art. When the impulse accepting and release control circuit 1 is first operated the numerical counters 3–9, Fig. 2, the elements comprising an incoming digit distributor 2 and those comprising an outgoing sender 17 are all prepared for operation. The incoming digit distributor 2 preferably comprises electronic circuit elements arranged as a distributor or ring having at each position means of controlling one of a series of electronic switches or gates 10–16, the first operation of the impulse accepting and release control circuit 1 causing the incoming digit distributor 2 to open a gate 10 to mark the A code counter 3. The A code counter 3 together with the B code counter 4, the C code counter 5 and the numerical counters 6, 7, 8 and 9 each comprise electronic elements arranged as counters in a well known manner and each counter is set to a preferred starting position as soon as the register is taken into use.

The operation of gate 10 enables the first set of signals corresponding to the A code digit dialled by a caller to pass from 1 via gate 10 to be recorded in the A code counter 3. At the conclusion of the A code train, the impulse control circuit 1 operates and transmits a signal which causes the electronic distributor 2 to change from its preferred or starting position to a second position in which second position it applies a signal to open gate 11, gate 10 having been closed by the release of the preferred position. The second set of signals representing the B digit may thus be recorded and stored by counter 4 in a manner similar to that described for the A digit, counter 3.

The foregoing cycle of operations is repeated for every digit dialled by the subscriber the distributor 2 opening successively gates 10, 11, 12, 13, 14, 15 and 16 and permitting the storage of successive trains of impulses from the subscribers circuit on counters 3, 4, 5, 6, 7, 8 and 9.

(b) *Identifying code digit translations*

At any time after the seizure of the register that may be convenient a start signal may be transmitted from the register over a common lead 64 to operate gate 29 in the common translator. This is only of advantage where the codes dealt with by the translator are sufficiently few in number to enable the use of cold cathode tubes as elements of the code ring 58 to be practical in which case the operation of gate 29 causes a preferred cold cathode tube in the code ring to be struck. When the code ring elements are made up of hot cathode valves or the like, gate 29 and wire 64 may be omitted.

The code ring 58 in the translator consists of a distributor or ring of electronic elements such as valves or cold cathode tubes each element corresponding to a complete exchange or service code or group of codes for which the translator supplies translations. The code ring is driven from a common pulse generator in such a manner that the elements of the ring are operated on in a preferred sequence. Each element of the ring is connected to two sets of electronic switching elements one set comprising elements such as 36, 37 and 38 and the other elements such as 39, 40 and 41. The circuit arrangements of the translator are such that only the two sets of switching elements corresponding to one particular code are operational at any instant. The number of elements in the group 36, 37 and 38 corresponds to the maximum number of digits in any code designation while the number of elements such as 39, 40 and 41 varies with the maximum number of items of translation information it is required to send for any particular code. In any particular position of the code ring 58 a stimulus is applied to a particular set of elements such as 38 etc. associated with the code of which the position of the code ring 58 is indicative.

A common pulse generator 30 supplies shaped pulses to the operated electronic switch or gate 29 and thence to a counting device or distributor 59 which is driven by the pulses to operate in sequence the electronic gates 31, 32, 33, 34 and 35 these gates containing within their circuits means for permitting pulses from the common pulse generator to be distributed over control leads such as 60, 61, 62 and 63.

The pulse which is emitted from gate 32 and which is numbered P1 in Fig. 1 is reverted over a common lead 60 to all the registers to a counting device 23 causing the device 23 which acts as a coincidence recorder to be reset to a preferred starting position.

The following three pulses (P2, P3, P4—Fig. 1) from the common pulse generator appear at the outputs of sequence gates 33, 34 and 35, Fig. 2, respectively, and these three outputs are connected over commoned wires 61, 62 and 63 respectively to the switch elements previously referred to and of which three (36, 37 and 38) are shown and these elements are considered to be in a condition to operate when stimulated by pulses on wires 61, 62 and 63, occurring at the time when a discriminating condition is marked over wire 65 by the operated element of the code ring 58.

Electric signals from the switch elements 36, 37 and 38 will appear in sequence on wires 66, 67 and 68 respectively, which wires will be joined respectively to one wire in a different set of eleven wires each set terminating on one of the register code counters 3, 4 and 5 and corresponding to the possible counter positions.

As an example consider that the code ring element marked is that equivalent to code ACO(220) and that 36, 37 and 38 are the associated gate or switch elements, then the wire 66 connects to the digit 2 wire of counter 3, wire 67 connects to the digit 2 wire of counter 4, and wire 68 connects to the digit 0 wire of counter 5 of all registers using the translator.

The pulses to the switch elements 36, 37 and 38 are serial in time as shown in Fig. 1 and consist of pulses P2, P3 and P4. If the P2 pulse to counter 3, Fig. 2, is connected on a wire which terminates on a marked counter element in 3, then there will be generated at 3 a resultant pulse which passes via wire 70 into the electronic coincidence recorder 23. If pulse P3 is transmitted to a wire terminating on a marked counter element in the counter 4, then there will be generated in wire 71 a resultant pulse which will be recorded in the coincidence recorder 23. If the pulse P4, passing via the activated switch element 38 is transmitted on a wire terminating on a marked counter element of counter 5, then there will be generated in wire 72, a pulse which will be recorded in the co-incidence recorder 23.

The equipment 23 is arranged so that after recording a predetermined number of co-incidence events, a signal is applied to wire 73 to operate gate 42 and concurrently a signal on wire 74 stimulates gates 24, 92 and 93 to permit signals to pass into equipments 17 and 22 at the requisite time.

As previously stated there are provided in the code ring 58 as many elements as there are separate complete codes to be translated by the translator and there will be provided at least three switch elements such as 36, 37, 38 for association which each element of the code ring. The elements of the code ring are arranged in a manner familiar to those skilled in the art, such that the valves or cold cathode tubes or other devices forming the elements may be energized in sequence by means of signals applied to control wires.

All switch elements connected to transmit "A" digit information will be commoned to the wire 61, switch elements connected to transmit "B" digit information will be commoned to the wire 62 and all switch elements arranged to transmit pulse information in respect of the "C" code digit will be commoned to wire 63.

Thus at the conclusion of pulse P4 a register or registers storing code information in the counters 3, 4, 5 corresponding with the signals transmitted by the translator will have recorded three co-incidence events in the recorder 23.

The cessation of the pulse P4 causes a change in the conditions applied by gate 35 to the gate 42. This change in conditions opens gate 42 to allow the shaped pulses generated by the pulse generator 30 to pass into equipments 43, 44, 45, etc. Thus the fifth pulse in the time scale corresponding to P5 in Fig. 1 operates gate 43 and causes a pulse to be transmitted over wire *a* to the electronic outgoing control switch 22 of which there is one per register. Wires *a–g* are common to all the registers served by the translator. The electronic outgoing control switch 22 consists of an electronic counter operated in a well known manner to control the sending of selecting signals to the exchange equipment.

Pulse P5 represents an interrogation signal to the registers to determine whether any register requires translation train No. 1 of the particular ABC code that has been offered. The pulse will be received in all registers and will cause transmission of a coincidence signal from the outgoing control switch over wire 75 to the coincidence recorder, in any or each register wherein the outgoing control switch indicates or records that translation train No. 1 is required. If this pulse received by the coincidence recorder over wire 75 is the fourth such pulse received since the P1 pulse then the recorder 23 of each and every register so conditioned, emits a responding pulse over wire 73 (Fig. 1) which wire is common to all registers. This pulse on wire 73 (Fig. 2) causes gate 42 to shut to prevent the passage of further pulses from the generator 30. The closure of the gate 42 leaves gate 43 in an operated condition and gate 43 extends a signal to its associated translation gate 51 to prepare it for future use.

The response of the coincidence recorder 23 to the fourth pulse also causes a signal on wire 74 to open the three gates 24, 92 and 93. These three gates control the switching of a set of twelve wires from the translator which are commoned to all the registers served by the translator. Thus in one or more registers the operation of the gates 24, 92 and 93 conditions the register equipment concerned to receive the digital translation information respecting translation train No. 1.

It is to be understood that the elements at sequence gates 31—35 are each operated by pulses serially related in time and recurring cyclically. For example sequence gate 32 is operated by pulses numbered P1, P17, P33, P49, etc. while sequence gate 35 responds to pulses P4, P20, P36, P52, etc. Thus the sequence of pulses is repeated after every 16th pulse. Reference to Fig. 1 which shows schematically the timing of the pulses will make this clear.

The 16th pulse is directed by the pulse counting distributor 59 to the sequence gate 31 the output from which via wire 76 is caused to operate on each of the translation gates 51—57. Gates 51—57 are each linked respectively with gates 43—49 and gate 43 was left in an operated condition when gate 42 closed. Gate 43 extended a signal to translation gate 51 to prepare it for the transmission of pulse P16. Thus the pulse P16 transmitted on wire 76 is passed via gate 51 and emerges on wire 77, Fig. 1. Wire 77, Fig. 2, is connected to a number of the electronic switching elements referred to previously and of which one 39 is typical and is stimulated to transmit the pulse forward because of the condition on wire 65 produced by the particular code element in the equipment 58. The pulse is transmitted on wire 80, which will be connected to one of ten terminals each assigned a digital value in the denary scale, and extending via common wires to equipments 17 in each register.

It will be understood that other switching elements similar to 39 will be connected to wire 77 but will be controlled from differing code elements in equipment 58 to which they will be connected by wires other than 65, and that the output leads similar to 80 of these other switching elements will be connected to any of the ten terminals as dictated by the translation required for each specific code.

The 17th pulse delivered by the generator 30 is directed by the pulse counting distributor 59 to the gate 32, whence it emerges on wire 60 which is commoned to the coincidence recorder 23 of each register served by the translator. This pulse is transposed in gate 32 to be of opposite polarity to other pulses in the cycle and operates on equipment 23 in each and every register common to the translator, to reset the coincidence recorder circuits to the unoperated condition.

The effect of the restoration of the coincidence recorder in those registers which have at the previous pulse received digital information, is to cause removal of the signal from wire 74 to close the three gates 24, 92 and 93 in each register so activated.

The following three pulses P2, P3, P4 cause sequential operation of the gates 33, 34 and 35 as previously described and these gates relay the pulses to the switching elements 36, 37 and 38, where they are transmitted out over the common register wires. As no signal has as yet been sent to the equipment 58 to change the code element the code signals will be transmitted on wires 66, 67 and 68, via switching elements 36, 37 and 38 activated by the conditions on wire 65 as for the preceding cycle of events.

At the conclusion of pulse P4 a signal is sent from gate 35 to operate gate 42, which permits the pulses generated by the pulse generator 30 to pass into the gates 43—49. Gate 43 has however remained operated from the previous cycle and thus the next pulse P5 passes gate 43 to operate gate 44. Thus pulse P5 via gate 44 causes transmission of a pulse on wire *b*, which is the interrogation signal to registers to determine whether translation train No. 2 is required. If the translation train is required then the coincidence recorder 23 of the register which requires the train will emit a demand pulse over wire 73 to close gate 42, which will leave gate 44 operated and condition the associated translation gate 52 ready to transmit pulse P16 when offered. The switch 40 is typical of many other switches commoned to wire 78, and 40 when stimulated by a pulse on wire 78, would be enabled to transmit the pulse to wire 81 because of the condition of wire 65 activated by the particular code element which is part of the equipment 58.

If the translation train No. 2 is not required the pulse P6 would pass gate 42, gate 43 which had been previously operated, gate 44 which would be operated and would bring about the operation of gate 45. Coincident with the operation of gate 45 a pulse would be transmitted on wire *c* in the form of an interrogation signal respecting train No. 3. If no demand is received over wire 73, then gate 42 remains open and pulse P7 would operate gate 46 which would in turn cause a pulse to be transmitted on wire *d*. Again assuming the absence of a demand signal pulse P8 would appear to operate gate 47, P9 to operate gate 48, P10 to operate gate 49. The operation of each of the gates 47, 48 and 49 would produce a pulse on each of the wires *e*, *f* and *g* in synchronism with the operation of the respective gates, these pulses serving as interrogation signals in respect of translation trains 5, 6 and 7. In the absence of a demand signal following pulse P10, pulse P11 operates gate 69 and causes a signal to be emitted on wire 83 to equipment 58, wherein the operated code element is restored, gate 42 being closed at the same time and a new code element is energised, resulting in the removal of the signal from wire 65 and its replacement on a similar but different wire. Thus on each occasion when a pulse operates gate 69, there is a resultant signal on wire 83 which produces a change in the code element in use.

(*c*) *Sending translation digits*

A pulse number P16 which follows a signal on wire 73 causes a signal to appear on one of the ten digital wires or on one of the wires 90 or 91. A pulse on one of the ten digital wires causes the electronic sending equipment 17 of which there is one per register to switch an element as indicated by the digital value signalled and to restore to normal a preferred element, which was normally operated.

It is to be understood that the equipment 17 comprises electronic means wherein a preferred element is normally operated and means whereby any one of ten other elements may be operated in response to a signal on one of ten wires, the element operated indicating the digital value of the received signal, the preferred element being restored to normal upon operation of any one of the ten other elements and means whereby on the application of pulses to the equipment 17, the equipment 17 may be caused to revert to its preferred condition of operation in such a manner that in reverting to that condition each pulse causes an element of lower digital value to be operated, and means whereby the pulses supplied to revert the equipment to its preferred or home position may be caused to control via equipment 20 the movement of selecting devices over such wires as M and N.

The restoration of the preferred element in equipment 17 permits pulses generated at 18 to pass via gate 84 which is normally open into 17 and to operate each element in descending order of digital magnitude, until the preferred element is re-operated. This reoperation causes the cessation of the pulses generated at 18 and causes a signal to be sent to equipment 21 which measures off a minimum time period and for the duration of this period inhibits the operation of equipment 17 from the pulse source 18 by closure of gate 84.

It is further arranged that when the preferred element in equipment 17 restores to normal a signal is transmitted to the outgoing control switch 22 which operates the element therein associated with wire *b*. A signal is also sent from equipment 17 to device 23 to inhibit operation of the latter until such time as the preferred element of 17 is re-operated. In the example shown in Fig. 2 means are provided for up to seven translation trains in respect of any code, but a greater number of trains may be provided though such provision may entail alteration of the number of pulses per cycle and also of the pulse repetition speed.

(*d*) *Sending stored number digits*

In a typical arrangement according to the invention the registers are arranged to accept sequential items of translation information up to a maximum for example of seven and to transmit the translation trains as indicated by the translator signals and to follow the transmission of the translation trains by any numerical digits stored in the counters 6, 7, 8 and 9. It is a further feature of the invention that if the number of translation information signals in respect of any code are less than the maximum, then the translator sends a signal following that relating to the last item of translation information which is extended by such a device as 41 to the wire 90 and thence via gate 92 into equipment 22. This signal causes the electronic control switch 22 to extend a signal to operate gate 25. When the code digits are not followed by numerical digits as will be hereinafter described, the said signal following the last translation is applied over lead 91 to gate 93.

When equipment 17 is in the preferred condition a signal is connected to wire 86, which passing via gate 25 into counter 6 will cause a signal to emerge on one of 10 wires represented by lead 85, the wire on which the signal appears corresponding in digital value to the information in respect of the digit stored in counter 6. Counter 6 comprises an electronic storage circuit with elements connected to receive and store the ten digits 1–0. Counter 6 will have received information relating to the first digit of the wanted subscribers number following the code in this case the thousands digit of the numerical train. Connecting from each of the digital elements in 6 are wires terminating on the equivalent digital elements in 17 via the lead marked 85 which symbolises ten wires. Each of the elements in counters 6, 7, 8 and 9 representing the same digital value are joined to one of the ten wires 85, means being provided in each counter to prevent signals from one counter from feeding into any of the others.

When the preferred element of equipment 17 is operated a signal is passed on wire 86 to the gates 25, 26, 27 and 28. Gate 25 is operated by reason of the conditions applied by the outgoing control switch 22 and the pulse from 17 is thus passed into counter 6 where it is switched on to one of the ten wires 85 by means of an operated element in 6. The pulse received in 17 causes operation of one of the digital elements corresponding in value to the operated element in counter 6, and restoration of the preferred element in 17. Restoration of the preferred element in equipment 17 permits pulses generated at 18 and fed via gate 84 with equipment 21 normal, to operate each element in 17 in turn and in descending order, commencing with the element operated from counter 6 and concluding with the preferred element. For each element so activated a pulse is transmitted to equipment 20 and regenerated there in a form suitable for operation of the called number selecting equipment. When the preferred element in 17 is reactivated it supplies a signal to operate equipment 21 which results in the closure of gate 84 for the time delay period determined by equipment 21. During this operation the outgoing control switch 22 is caused to energise the next element and this change results in the removal of the signal from gate 25 and transfer of the signal to gate 26. The cycle of events is now repeated with the digital information in counter 7 being transferred to sender equipment 17, and transmitted by the equipment 20. This process is repeated for the remaining digits of the number stored in counters 8 and 9 respectively.

*(e) Releasing end order*

After transmission of the last stored digit and when equipment 21 has restored to normal and the preferred element of 17 has been operated a signal is passed to the outgoing control switch 22 which relays the signal on wire 89 to the impulse accepting and release control circuit 1. This signal causes operation of the release control circuit which causes the register to be dissociated from the exchange selecting equipment and for energised elements in equipments 2, 3, 4, 5, 6, 7, 8, 9, 17 and 22, to be restored to normal. Thereafter the register is free for association with any other calling circuit.

*(f) Service code end order release*

According to another feature of the invention provision is made to deal with those calls in which the designation consists of a code without following numerical trains. Such codes are in the case of register translators associated with services such as trunks, Toll, Telegrams, O, etc.

The operation of the equipment on calls involving code without numerical digits is as previously described up to the point at which the last translation signal has been sent by the translator, except that in the case where the number of digits in the code is less than the maximum, that is in this particular application less than three, coincidence between the elements such as 37 and 38 and the counters such as 4 and 5 may be sought over such wires as 67 or 68 connected to the eleventh or normally preferred element in those counters.

Assuming for the sake of example that the translation consists of two digits, and that there are no numerical digits, then when the translation has been sent a pulse will arrive and will be directed to operate gate 45 and to prepare translation gate 53. When pulse P16 occurs the resultant signal via gate 41 would produce a pulse on wire 82, which in the case of this particular code, would be connected to terminal 91 common to each register. Thus the pulse via terminal 91 would operate on equipment 22 and would cause the marking signal to be removed from wire *c* and connected to wire 89, where in equipment 1 it would cause operation of the release control circuit which in turn causes the register to be dissociated from the exchange selecting equipment.

Another feature of the invention is the means provided whereby a register requiring translation information in respect of a code not recognised by the translator may be signalled that the translation cannot be given and caused to remove a demand from wire 64, Fig. 2.

*(g) False demand release*

For the purpose of description it is assumed that the translator is not in service due to absence of a demand on wire 64. Now assume a register storing code information in counters 3, 4 and 5 in respect of a code which is fictitious originates a start condition on wire 64. Resulting from this signal a preferred code element in equipment 58 is operated and code signals as previously described are offered sequentially on wires 66, 67 and 68. Co-incident with the operation of the preferred element of the code ring a signal is transmitted over wire 87 and recorded in the equipment 22 of the calling register and any other registers which may be awaiting translation information. This signal occurs on each occasion that the preferred element of the code ring is operated. Thus on the second connection of a signal to wire 87, signifying that the register which records two such signals has been offered every available code dealt with by the translator the register recording a fictitious code in the counters 3, 4, and 5 will be caused to release from the associated exchange selecting equipment by virtue of a signal transmitted from equipment 22 to equipment 1 to cause the release control equipment 1 to function.

V. REGISTER SUB-COMBINATIONS

*(Fig. 2 and Figs. 3–9)*

Figure 3:
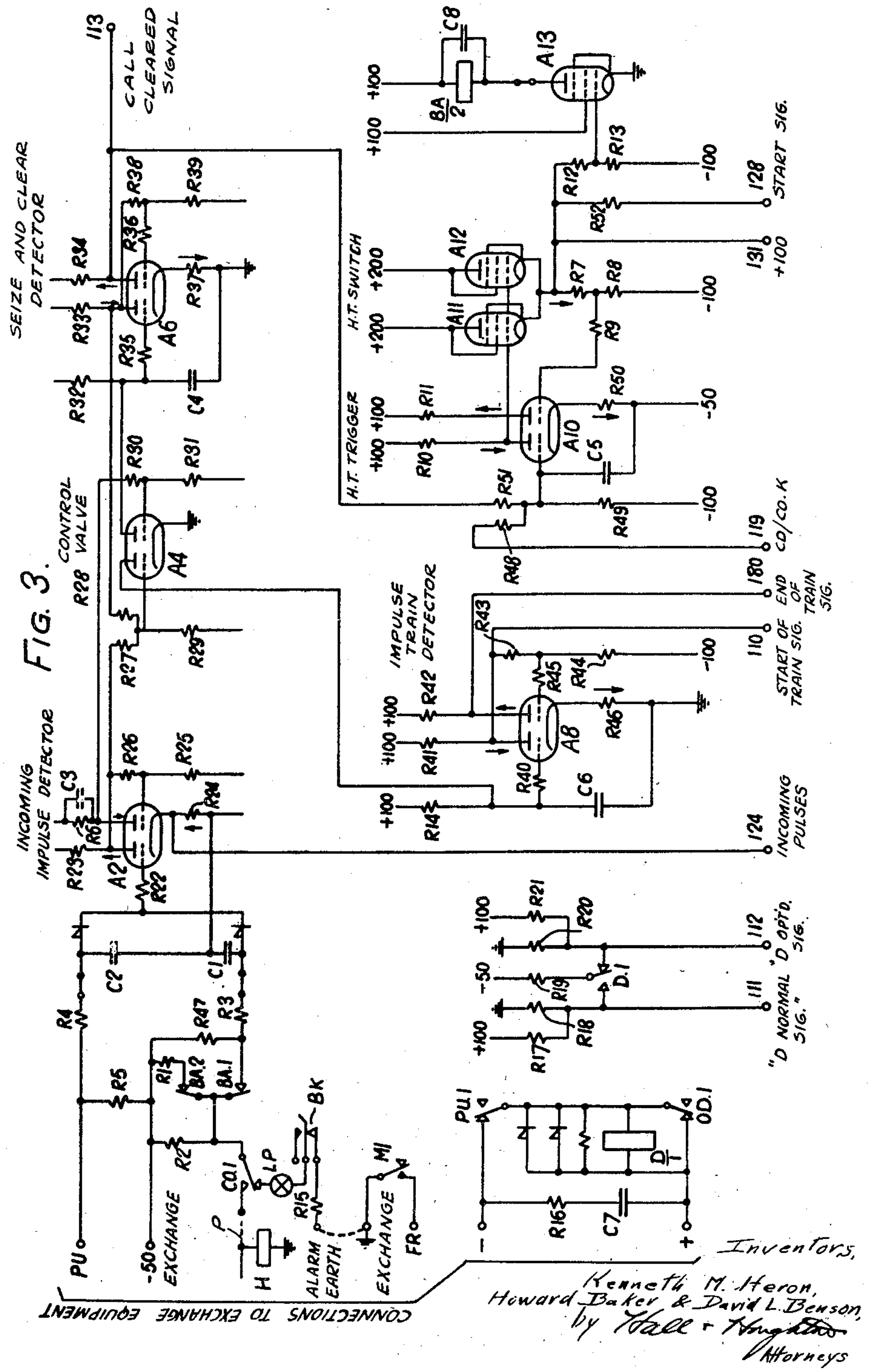

The register connections and circuits for a two code digit and four numerical digit system will now be described in greater detail. Referring first to Fig. 3 of the drawings, the five wires —, +, P, PU and FR are connected to the appropriate contacts on the banks of the "A" digit selectors. Contact CO1 (shown in the unoperated condition) is normally operated if the register is available for traffic, and a searching A digit selector which will be referred to as A. D. S. encounters a —50 volt potential on the wire P, this potential being derived from the exchange 50 volt battery and fed to the wire via the resistors R1 and R2 in parallel. When the H relay of the successful A. D. S. operates to the free condition, the earth potential condition is applied via the 20 ohms H relay winding to the wire P, and the grid (L) of valve A2 rises slowly to earth potential under control of the time constant of the resistor/capacitor combination R3/C1 which is provided in order to delay the operation of the incoming impulse detector (valve A2) for about 7 milliseconds. In this period any possible mechanical bounce of the H relay contacts will have subsided. The facility of initial seizure via the wire P is conventional for battery testing circuits employing forward holding and prevents the seized equipment from being permanently locked up should the A. D. S. for fault reasons fail to complete the PU connection.

The valve A2 corresponds in function to the A relay of an electro mechanical director while the valves A6 and A8 are equivalent to the B and C relays of such a director respectively.

Considering valve A2, under idle conditions, the anode (R) is conducting and by virtue of the anode to cathode impedance ratio, the cathode is at a potential of —12 volts with respect to earth. Thus when connection to earth through the 20 ohms resistance of the relay H is applied to the wire P, the grid (L) rises towards earth potential, and at some potential of the grid of the order of —17 volts, anode (L) conducts and via grid (R) cuts off anode (R). Due to the changed ratio of anode to cathode impedances, the cathode potential of valve A2 falls from —12 volts to —31 volts. The operation of the relay contacts BA1 and BA2 upon seizure of the register as will be hereinafter described, leave the grid (L) of A2 dependent upon the conditions supplied on the PU wire, which, subsequent to the operation of the relay H, has been connected to the impulse repeating relay in the 1st code selector, by the operation of the A. D. S. relief H relay. The impulses dialled by the subscribed, and repeated by the L relay (1st code selector) appear as 66 millisecond disconnection periods on the PU wire, each such disconnection being succeeded, by an earth period of 33 milliseconds or a continuous earth period in the case of the last disconnection in an impulse train.

When earth potential is removed from the PU wire, the condenser C2 connected to the PU wire commences to discharge via the resistors R4 and R5 to —50 volts. The cathode potential at A2 at the instant of earth disconnection of the PU wire is —31 volts and the grid (L) falls towards this value under control of the time constant, producing a delay of some 7 milliseconds, before the anode (L) ceases to conduct. Due to the dissimilar anode impedances the change from anode (L) to anode (R) will produce a positive pulse of about 19 volts amplitude. Due however, to the condenser shunt C3 across the load resistor R6 of anode (R) the valve behaves under these conditions as a cathode follower and the cathode rises to grid (R) potential which is +9 volts. Thus at the instant of the changeover of valve A2, due to disconnection of earth from the PU wire, the cathode potential rises from —31 volts to +9 volts and then decays exponentially to —12 volts. The rate of decay is controlled by the time constant of R6/C3 combination in the anode (R) of valve A2. Upon reconnection to earth of the PU wire, the incoming impulse detector A2, re-operates with anode (L) conducting and the cathode at —31 volts.

The incoming impulse detector (valve A2) is connected to control the seize and clear detector (valve A6) operating as a trigger and the impulse train detector (valve A8), via an intermediate control valve A4. The grid (L) of valve A6 under unseized conditions passes grid current. When the grid (R) of valve A4 is made positive by the changeover of valve A2 consequent upon earth potential applied to A2 grid (L), the grid (L) of valve A6 is quickly reduced to earth potential. Under quiescent conditions the cathode of valve A6 rests at approximately +12 volts and lowering the grid (L) to earth potential cuts off anode (L) which via grid (R) causes anode (R) to conduct. When anode (R) conducts the reduced ratio of anode to cathode impedance causes the cathode potential to rise to +30 volts. Thus for the trigger valve A6 to restore to normal, condenser C4 in the lead to grid (L) must charge to approximately —30 volts, and the time constant of the charging circuit is so proportioned that this rise takes about 150 milliseconds. Therefore, if after seizure due to earthing the PU wire, this earth is removed for a period exceeding 150 milliseconds, valve A6 is permitted to restore and on restoration generates a positive signal at anode (R) which is applied to lead 113 and constitutes the clear-down signal.

In electro-mechanical equipment it is usual to give B relay a release time of 250 milliseconds minimum, this static lag being dictated by the requirement that the B relay in adverse adjustment must hold to trains of 12 impulses per second (I. P. S.) 33% make ratio. The electronic B relay however, needs only to have sufficient lag to cover the longest legitimate break period in dialling—its energisation in the arrangement shown being less than 1 millisecond. Thus the electronic B relay need only exhibit a lag sufficient to cover dialling breaks of 7 I. P. S. 70% break ratio, which is equivalent to 100 milliseconds.

The valves A10, A11, A12 and A13 are controlled from the seize and clear detector valve A6. Valves A11 and 12 are triode connected pentodes wired in parallel to serve as a cathode follower. The control grid of this cathode follower (A11 and 12) are connected to the anode (L) of the H. T. trigger valve A10, which in the idle condition of the register maintains the grid at +10 volts. When A6 changes over on seizure of the register, the anode (R) conducts and drives the grid (L) of A10 to a more negative potential. The condenser C5 in the lead to grid (L) of valve A10 causes a delay of about 50 milliseconds before valve A10 changes over. On changeover the potential of anode (L) of A10 rises and raises the potential of the grids of A11 and A12 to +100 volts, to which the potentials of the cathodes also rise. A potential tapped from the cathode load resistors R7, R8 of A11 and A12 is fed back via resistor R9 to the grid (R) of A10 to hold the valve operated. Again the dissimilar anode load resistors R10, R11 of A10 ensure that the grid (L) must be raised above its original static potential in order to restore the trigger. The cathode potential of valves A11 and A12 is fed via a potentiometer comprising resistors R12, R13 to control valve A13, in the anode circuit of which is a relay BA which on operation disconnects the P wire earth condition from valve A2.

The impulse train detector valve A8 is arranged to operate on the first break impulse received by valve A2 and to remain operated until a break impulse longer than 120 milliseconds is detected. The operation of valve A8 is made dependent upon the operated conditions of the seize and clear detector valve A4, the two conditions being combined on grid (L) of valve A4. Thus when grid (L) of A4 is made positive with respect to cathode anode (L) conducts and discharges the condenser C6 in the lead to grid (L) of valve A8. Since the cathode of valve A8 is at +15 volts when normal, the condenser C6 in discharging lowers the grid (L) to earth potential thus cutting off anode (L). At changeover the potential of anode (L) rises to +100 volts approximately and this positive going signal is used applied to lead 110 to indicate the commencement of an impulse train. During dial make periods when earth is connected to the PU wire, the condenser C6 charges via resistor R14 and in order to restore, the impulse train detector must reach a potential of approximately 32 volts. To achieve this voltage with the given time constants, the earth condition must persist on the PU wire for at least 120 milliseconds. When the impulse train detector does restore, a positive going signal is generated at anode (R) of valve A8 and is applied over lead 108 to indicate the end of train condition.

Figure 4:
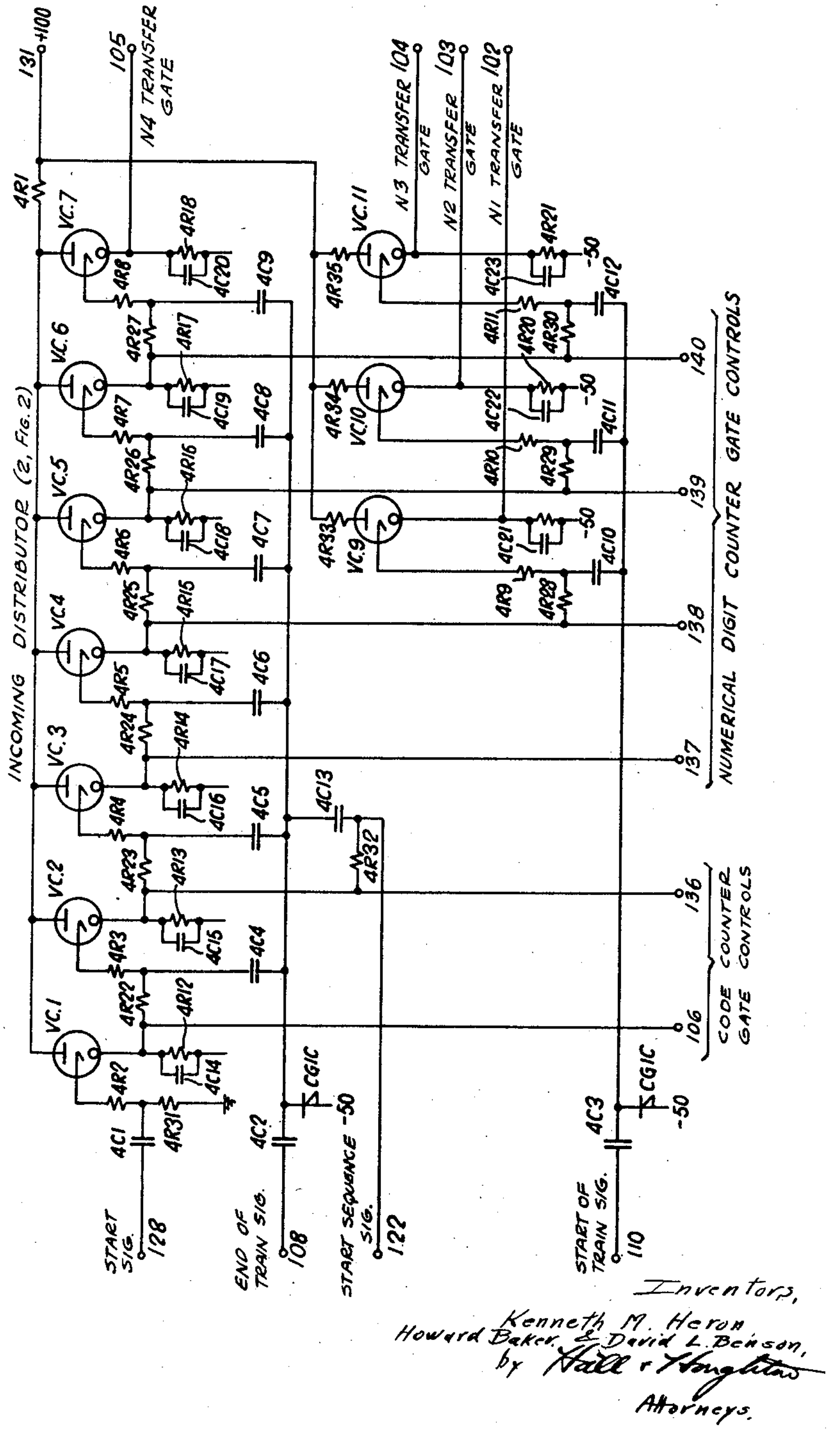

(*a*) *Distributor* (2, *Fig. 2; Fig. 4*)

The incoming distributor (typical of item 2, Fig. 2) which serves to direct the incoming trains of impulses to the appropriate counters will now be described with reference to Fig. 4. The distributor makes use of cold cathode tubes the anodes of which are commoned, in the manner conventional to counters and fed via a common load resistor 4R1 from the +100 volts supply over lead 131 controlled by valves A11 and 12 (Fig. 3). Coincident with the application of +100 volts to the anodes of the cold cathode tubes, the positive potential rise is fed to the striker element of tube VC1 over lead 128, causing that tube to fire. The cathodes of tubes VC1 to VC7 are each connected to control the various input gates (typical of gates 10 to 16 of Fig. 2) of the storage counter circuits. Thus with tube VC1 energised, the cathode potential rises from −50 volts to approximately earth potential and the gate circuit tube D1 (Fig. 5) controlling the input of the B counter is energised over lead 106. At the conclusion of the impulse train, the detector (valve A8, Fig. 3) restores and the resultant positive pulse on the end of train wire 108 is communicated to the striker elements of tubes VC2 to VC7 causing tube VC2 to fire and tube VC1 to extinguish. Thus the "B" storage counter gate is closed and the "C" storage counter gate is opened. The tubes VC2 to VC7 are energised in turn for the duration of the receipt of a particular impulse train. Tubes VC9, VC10, VC11 and VC7 are provided to record the receipt of the thousands, hundreds, tens and units impulse trains respectively. This separate storage is necessitated by the requirement that the transmission of a particular numerical train must be delayed until the digit has been completely received and this is generally recognized by the commencement of dialling by the subscriber of the succeeding train. Tubes VC9, VC10, VC11 and VC7 when energized remain so until the register is released.

Figure 5:
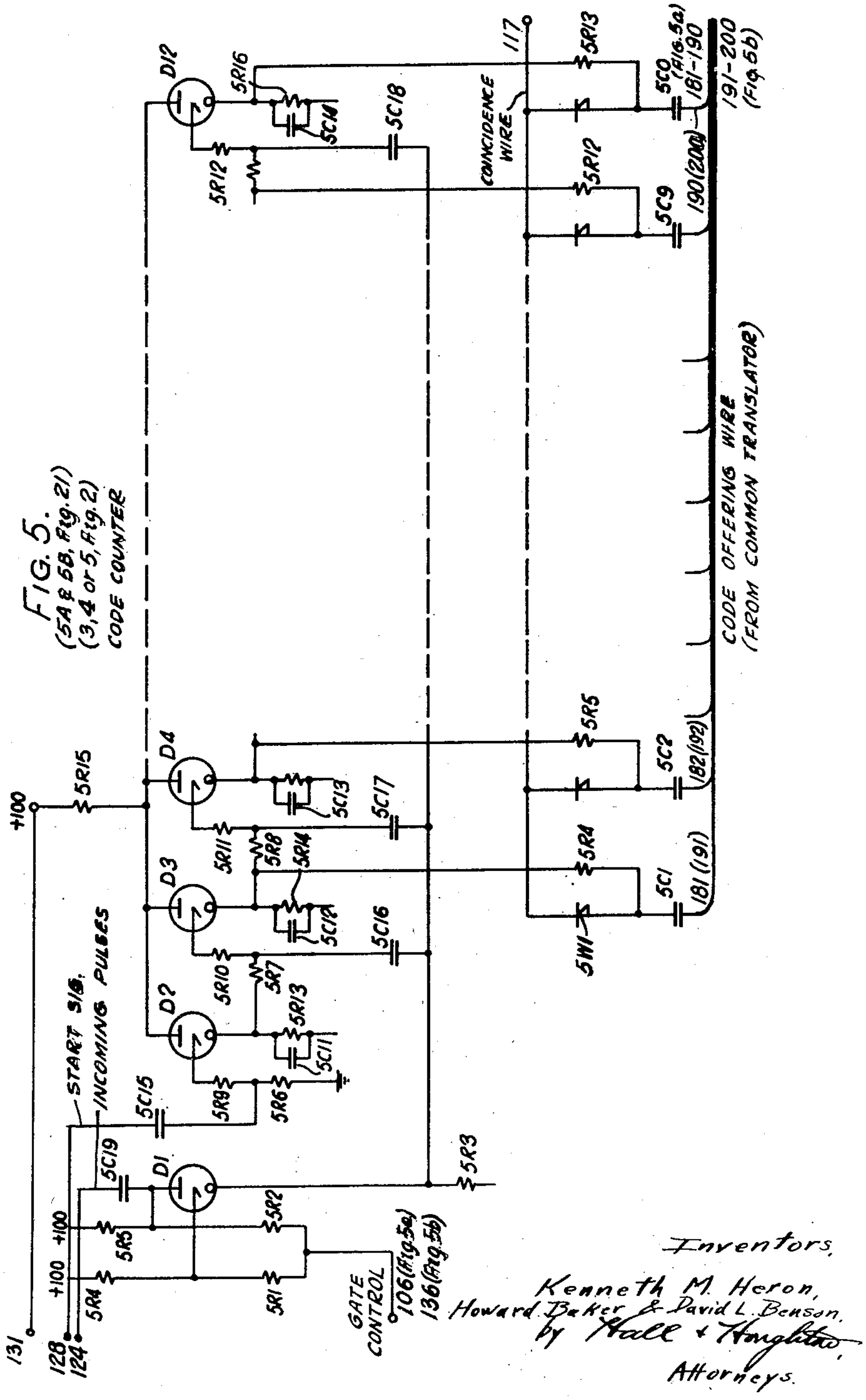

(*b*) *Code storage counters* (*Fig. 5*)

The B and C code storage counters (typical of items 3, 4, or 5 of Fig. 2) are of similar form and the circuit details are shown in Fig. 5. In Fig. 5 tube D1 is illustrative of the cold cathode type of input gate used with each counter. The gate is controlled from the cathode of the related tube VC1–7 in the incoming distributor (Fig. 4). When de-energized, the cathode of the incoming distributor circuit tube is at −50 volts and this potential is fed via resistors 5R1, 5R2 to hold the mid-points of a potentiometer network connected to the striker and anode of tube D1, at approximately zero volts. Therefore the striker and anode of the gate tube D1 are at zero potential and any signals on the anode condenser 5C19 received over wire 124 can raise the anode potential by an amount equal to the signal amplitude without causing the tube D1 to strike.

When the appropriate tube of the incoming distributor is energised, the striker and anode potentials of the tube D1 are increased to +30 volts, and thus with the cathode at −50 volts, the tube strikes and stabilizes at about 75–78 volts across the main gap. Any increase in positive potential at the anode, such as would be produced by a positive going pulse on wire 124, appears as a signal across the cathode load resistor 5R3 of the gate tube D1. The positive potential end of the resistor 5R3 is connected to the input circuits of each of the counter tubes D3 to D12 and will cause the counter to step according to the pulses on wire 124.

Figure 17:
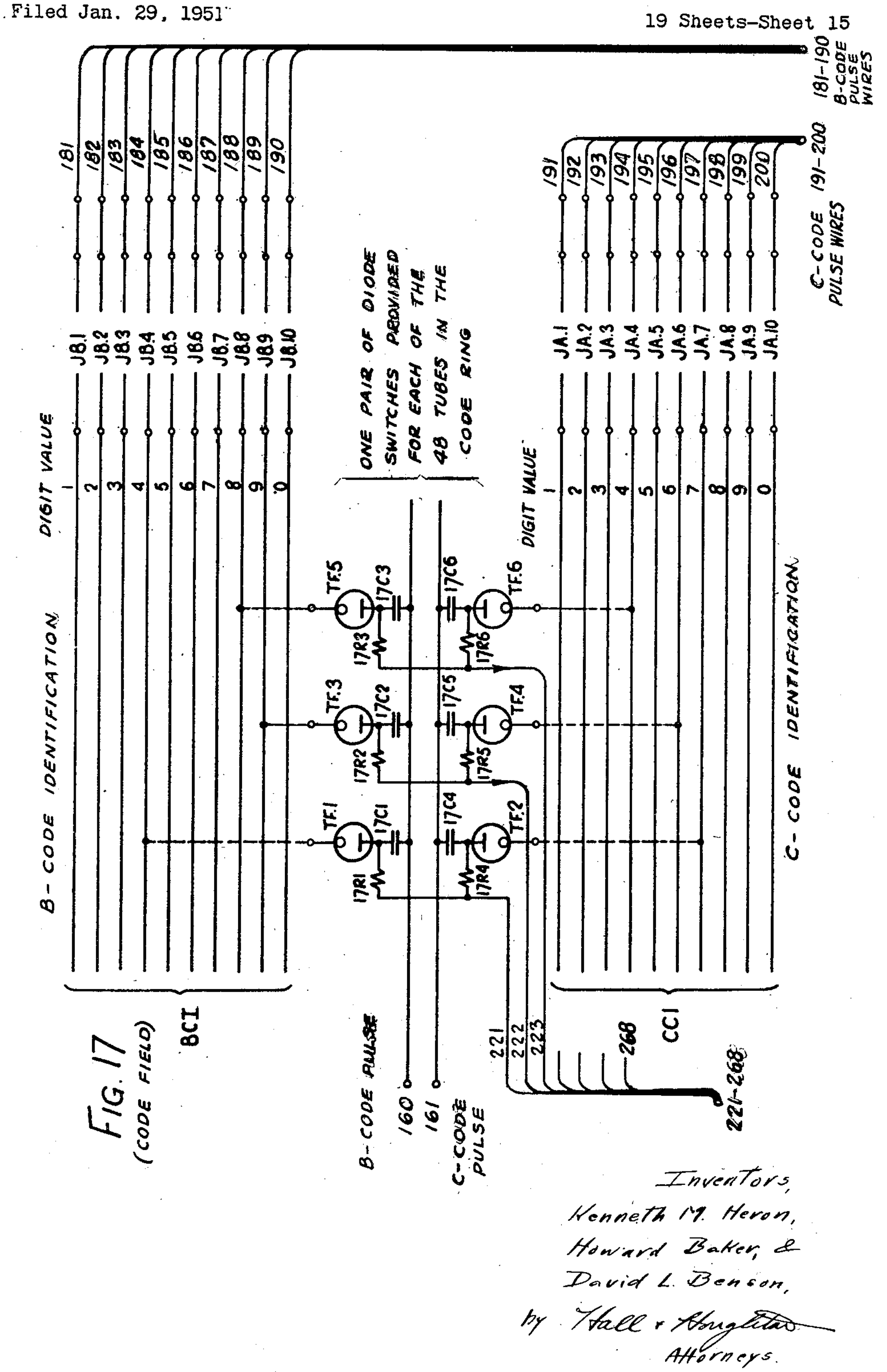

According to the code offered, one of the ten code offering wires 181–190 for the B code counter or 191–200 for the C code counter incoming from the translator Fig. 17 is energised by a positive going pulse.

Each code offering wire terminates on a condenser 5C1, 5C2, 5C3 . . . 5C10, the other terminal of each of which is connected via a high impedance 5R4, 5R5 . . . 5R13, to the respective tubes D3 . . . D12 in the associated counter and of which only tubes D3, D4 and D12 are shown. The said other terminal of each of the condensers 5C1–5C10 is also connected through a rectifier 5W1–5W10 to a common lead 117. Thus a 40 volt positive going pulse injected on code offering wire 181 or 191 connected to the cathode of tube D3 at −50 volts, is unable to bias the associated rectifier 5W1 into conduction. If, however, the 40 volt positive pulse appears on the wire 181 or 191 when the tube D3 is energised, then the condenser 5C1 is at earth potential and the positive pulse biasses the rectifier into conduction and a signal is transmitted over lead 117 and appears across a common load resistor 8R1, Figure 8.

Figure 8:
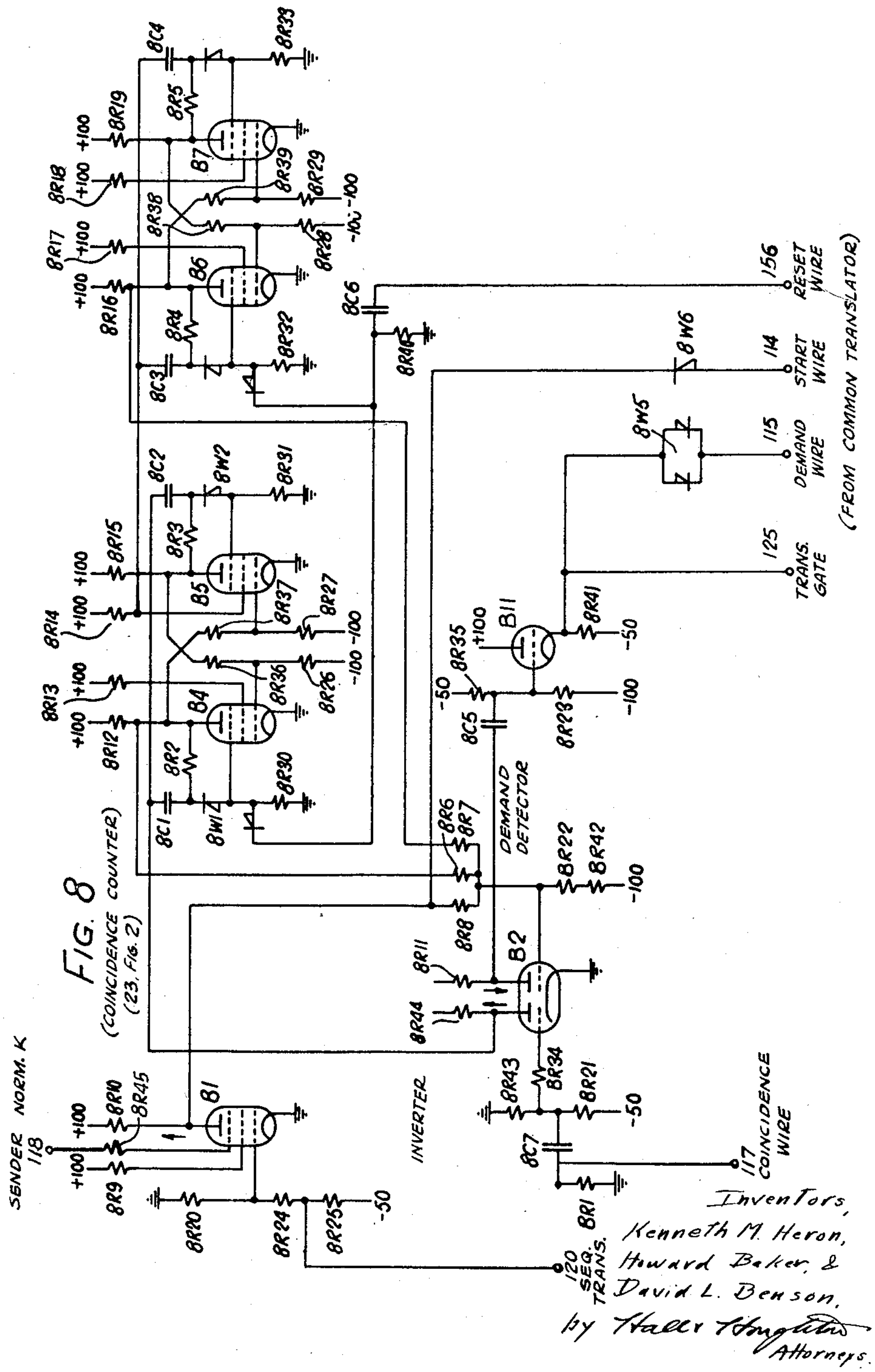

Such a signal indicates that the particular code digit stored in the code counter coincides with the code digit signalled by the translator and the coincidence event is recorded in the coincidence counter, Figure 8. Two successive coincidence events in a pulse cycle indicate that the code stored is identical with the code signalled by the translator.

(*c*) *Numerical counters*

The numerical counters, one of which is shown in Fig. 20, comprises twelve cold cathode tubes U1–U12 arranged to operate in a manner similar to the tubes D1–R12 of Figure 5. It is required that the numerical digits received from the calling subscriber should be transmitted without change, when a route to the called exchange has been established. Facilities are provided, therefore, wherein digital information stored in a numerical counter may be transferred to a cold cathode sender counter shown in Figure 6 (typical of item 17 of Fig. 2) and impulses appropriate to the digital information transmitted at 10 impulses per second. Transfer of digital information is effected by injecting a positive pulse of 40 volts magnitude on the transfer wires 141–150 of the appropriate numerical counter which are connected to the strikers of tubes K2–K11 of Figure 6. The numerical counter circuits (Fig. 20) differ from those of the code counters (Fig. 5) in that the positions of the rectifiers and capacitors in the transfer wires of the former are interchanged with respect to those in the code offering wires of the latter, and the polarity of the rectifiers is reversed. Thus the output sides of rectifiers 20W1–20W10 (to the input sides of which are connected the cathodes of tubes U2–U12 through resistors 20R4–20R13) are connected to the transfer wires 141–150, and the common lead 132, 133, 134, or 135 (to which the input side of each rectifier is also connected through a capacitor 20C1–20C10) is appropriately connected as hereinafter described, depending upon whether the counter is a thousands, hundreds, tens or units counter. Upon striking of a counter tube U2–U12 due to a potential rise across common resistor 20R3 produced by striking of the tube U1, the potential at the associated rectifier 20W1–20W10 will be raised 40 volts above earth for the pulse duration of 200 microseconds. The rectifier thus conducts and the potential of the striker in the appropriate tube K2–K11 in the sender counter (Fig. 6) will be raised by 40 volts thus striking the sender counter tube.

Figure 6:
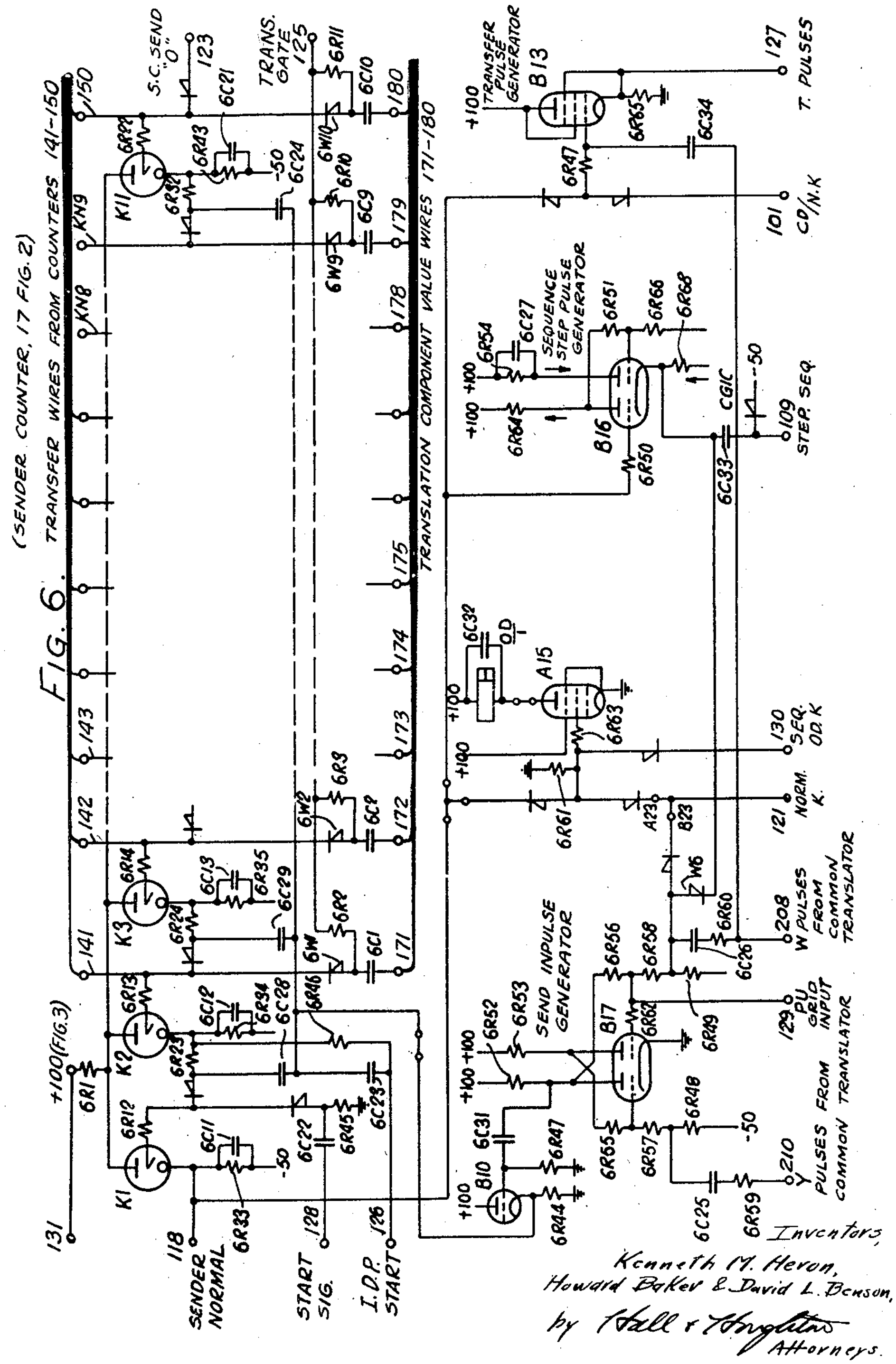

(*d*) *Sender counter* (*Fig. 6*)

Figure 7:
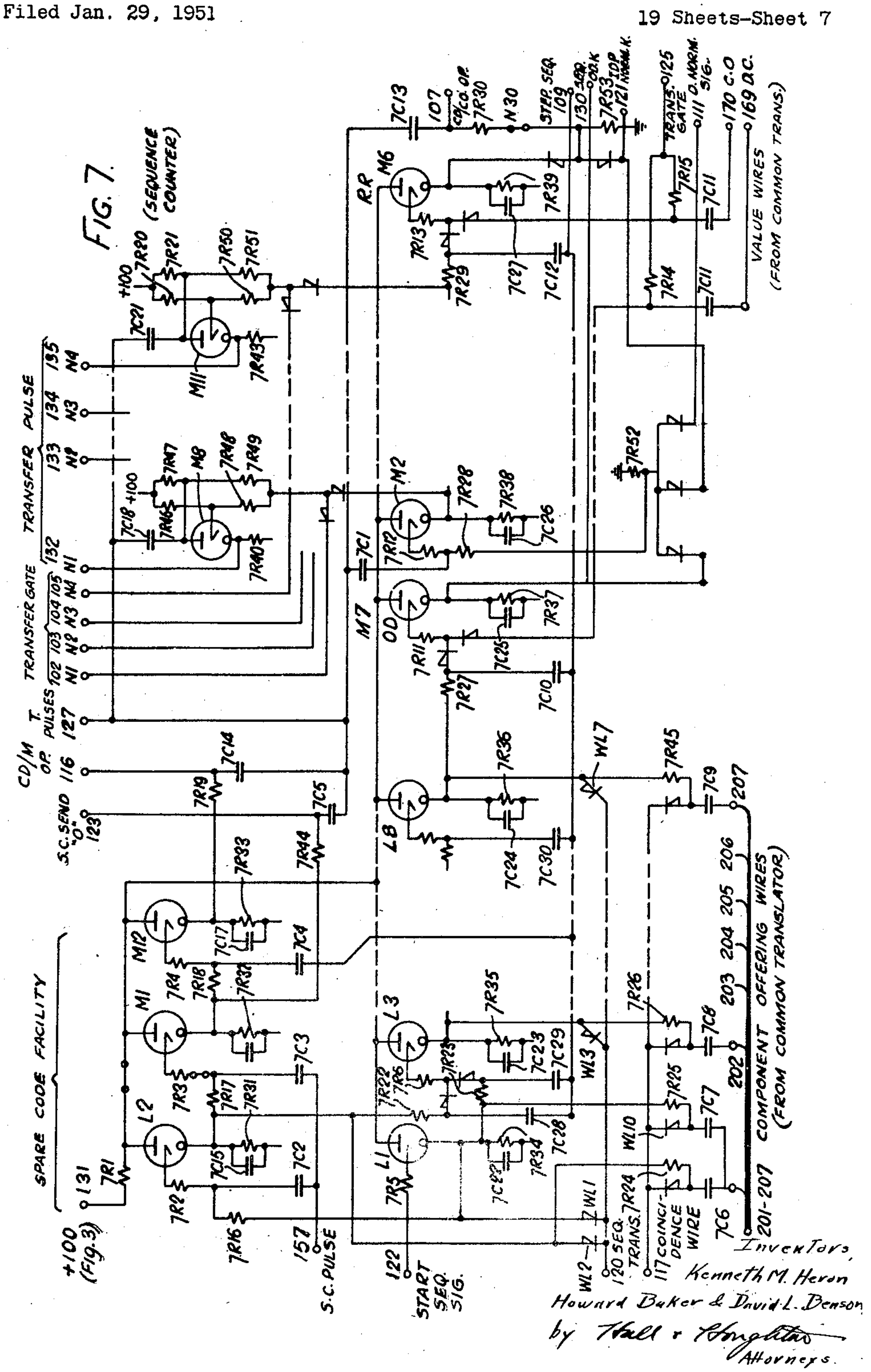

Referring to Figure 6, the sender counter is conventional cold cathode counter, connected so that tube K1 strikes over wire 128 at the same time as the +100 volts supply is connected to lead 131. Each of the tubes K2–K11, of which only K2, K3 and K11 are shown, is capable of being struck from the appropriate one of ten translation value wires 171 to 180 incoming from the translator (Fig. 18), or from the transfer wires 141–150 common to the four numerical counters. Any tube K2, K3, etc., on striking causes the primed tube K1 to extinguish due to the common adone load resistor 6R1. The potential of the cathode of tube K1 falls exponentially to −50 v. and at grid (L) of sequence step pulse generator valve B16 cuts off anode (L) which was conducting. Grid (R) of B16 becomes positive in potential and due to the reduced load of anode (R), there is a positive potential change at the cathode. This positive signal performs two functions:

(*a*) It is transmitted over lead 109 to the sequence counter shown in Figure 7 to operate the next tube of the counter in the sequence, and (*b*) It permits the "W" pulses, fed in from the common translator over lead 208, to bias grid (R) of the send impulse generator trigger valve B17 such that anode (R) conducts. The rectifier 6W6 connecting the cathode of B16 to the grid potentiometer of B17, acts as a diode clamp, and the change of B16 cathode potential raises the clamp voltage above the level necessary to render grid (R) positive in potential.

The W and Y pulses of 200 microseconds duration are fed from the common translator (Fig. 19) to leads 208 and 210 respectively and recur at repetition frequency of 10 impulses per second. The Y pulses are serially related to the W pulses by a time interval of 66 milliseconds, and similarly the W pulses occur 33 milliseconds after the Y pulses.

The Y pulses are applied to grid (L) of the send impulse generating trigger valve B17 and being positive, the grid (L) renders anode (L) conductive, if B17 has previously been operated by a W pulse applied to grid (R). Thus for the time that the potential of the cathode of valve B16 is at its positive extremity, the trigger valve B17 is operated (anode (R) conducting) for 66 milliseconds and unoperated (anode (L) conducting) for 33 milliseconds. This condition is terminated when the grid (L) of B16 is made positive with respect to cathode which occurs when cold cathode tube K1 is re-energised.

At each operation of the send impulse generator valve B17, the restoration of anode (L) to +100 causes a positive pulse to be transmitted to the impulse line common to the sender cold cathode tubes K2–K11 via valve B10. Thus at the commencement of each 66 millisecond period, the tube of the next lower digital value to the one energised, is struck and the preceding tube extinguished. Coincident with this operation the relay PU (Fig. 9) is operated by the positive potential at the grid (R) potentiometer of valve B17, which is transmitted over lead 129 of Fig. 6 to the grid of the control valve, A17 (Fig. 9) for relay PU. The relay PU in operating opens the loop at contact PU1 (Fig. 3) controlling the Strowger equipment, for a period of 66 milliseconds after which it is re-closed by the restoration of the send impulse generator valve B17 on receipt of a "Y" pulse.

Figure 9:
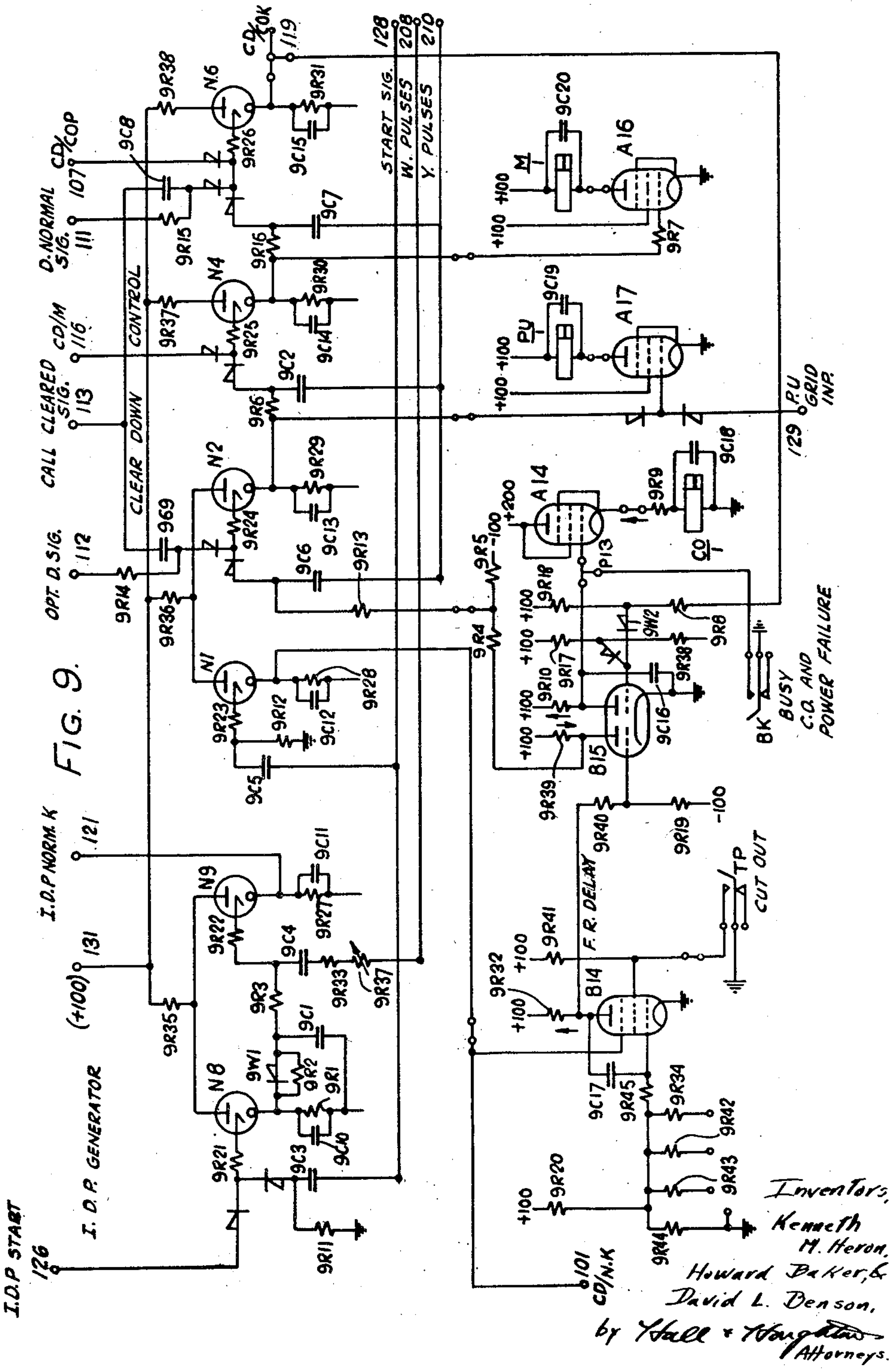

The commencement of the 66 millisecond period which causes tube K1 to be re-energised, also produces a positive start pulse on lead 126, which terminates in the inter-digital pause shown in Fig. 9 (typical of item 21, Fig. 2). This equipment in response to the start pulse, measures off a period of 700 milliseconds, during which, by application of a negative potential on the lead 121 it inhibits operation of the send impulse generator B17 (Fig. 6) even though the K1 tube, may have de-energised consequent upon operation of a tube K2–K11 in respect of the next translation or numerical digit.

Valve A15 and its anode relay OD in Fig. 6, provide a facility necessary on calls to exchanges equipped with Coder Call equipment. In such cases the numerical digits have to be translated into potential code by a coder equipment, which is associated with the junctions outgoing to the C. C. I. exchanges. The signal that a coder has been associated with the junction controlled by the register, and that the register may therefore transmit the numerical digits for coding is indicated by the absence of reversed potentials on the negative and positive wires incoming to the register. If reversed potential exists it is detected by the relay D (Fig. 3) which is introduced into the controlling loop by operation of the contact OD1 of relay OD to remove the short circuit from relay D. There are three conditions necessary for operation of the relay OD:

(*a*) Lead 130 from Fig. 7 must be at earth potential, thus indicating from the sequence counter that all the necessary translation components have been transmitted, (*b*) The sender must be at normal as indicated by the energised condition of tube K1 (Fig. 6), (*c*) The inter digital pause equipment must have restored to normal after measuring off the pause period which is indicated by earth potential on the lead 121 from tube N9 (Fig. 9).

Valve B13 (Fig. 6) is provided to gate W pulses, for use in transferring digital information from any of the numerical counters, into the sender counter. The gate is inhibited by commencement of a clear down signal over lead 101 from Fig. 9 which is connected to the control grid of valve B13, or by the sender off normal condition, in which case tube K1 is de-energised.

The ten translational valve component wires 171–180 incoming to the sender tubes K2–K11 from the common translator (Fig. 18), are connected to the strikers of the tubes through condensers 6C1, 6C2 . . . 6C10 and rectifiers 6W1–6W10, and resistors 6R2, 6R3 . . . 6R11 are connected from the rectifier side of condensers 6C1–6C10 to a common wire 125 which is normally at approximately −40 volts, and thus a positive pulse of 40 volts amplitude injected on one of the ten wires 171–180 raises the output side of the appropriate condensers 6C1–6C10 to earth potential which will not cause any tube K2–K11 to strike. When it is required for the sender to accept a signal from the common translator, the potential of the common wire 125 is raised to earth so that a 40 volt pulse injected on one of the ten wires 171–180 biasses the corresponding rectifier 6W1–6W10 to conduction and raises the striker potential of the tube K2–K11 associated with the wire to +40 volts, which causes the tube to strike.

(*e*) *Sequence counter* (*Fig.* 7)

The sequence counter circuit fulfills the function analogous to that of the control switch in an electro-mechanical director and will be described with reference to Fig. 7. After the B and C code digits have been stored in the code counters, a positive bias from VC2 (Fig. 4) together with a pulse over lead 108 from Fig. 3, is transmitted over lead 122 to strike tube L1 (Fig. 7). Each of the translation component distributor tubes L1–L8 of Fig. 7, of which only L1, L2, L3 and L8 are shown, has its cathode connected via rectifiers WL1, WL2–WL8 for decoupling purposes, to a common wire 120, which prepares a gate B1 (Fig. 8) to pass a start signal into the common translator over lead 114 when lead 118 from Fig. 6 is at earth potential. Each of the cathodes of tubes L1–L8 is also connected to bias a rectifier and condenser circuit connected to each of the seven component offer wires 201 . . . 207 incoming from the translator Fig. 14, the rectifier and condenser circuits connected to the cathodes of tubes L1 and L2 respectively, being commoned to wire 201. In each cycle of events, the translator having transmitted pulses characteristic of the code being offered proceeds to offer pulses, serially related on each of the seven component offer wires commencing with wire 201. These pulses serve to interrogate the registers as to the translation component required. If therefore a positive pulse is received on wire 201 and tube L1 or L2 is energised (indicating that component number one is required), the potential rise due to the pulse amplitude, biasses the rectifier WL10 or WL11 above earth potential into conduction and is applied over common wire 117 so that a signal voltage appears across the common load resistor 8R1 (Fig. 8) and this signal is recorded as the third coincidence event.

Figure 18:
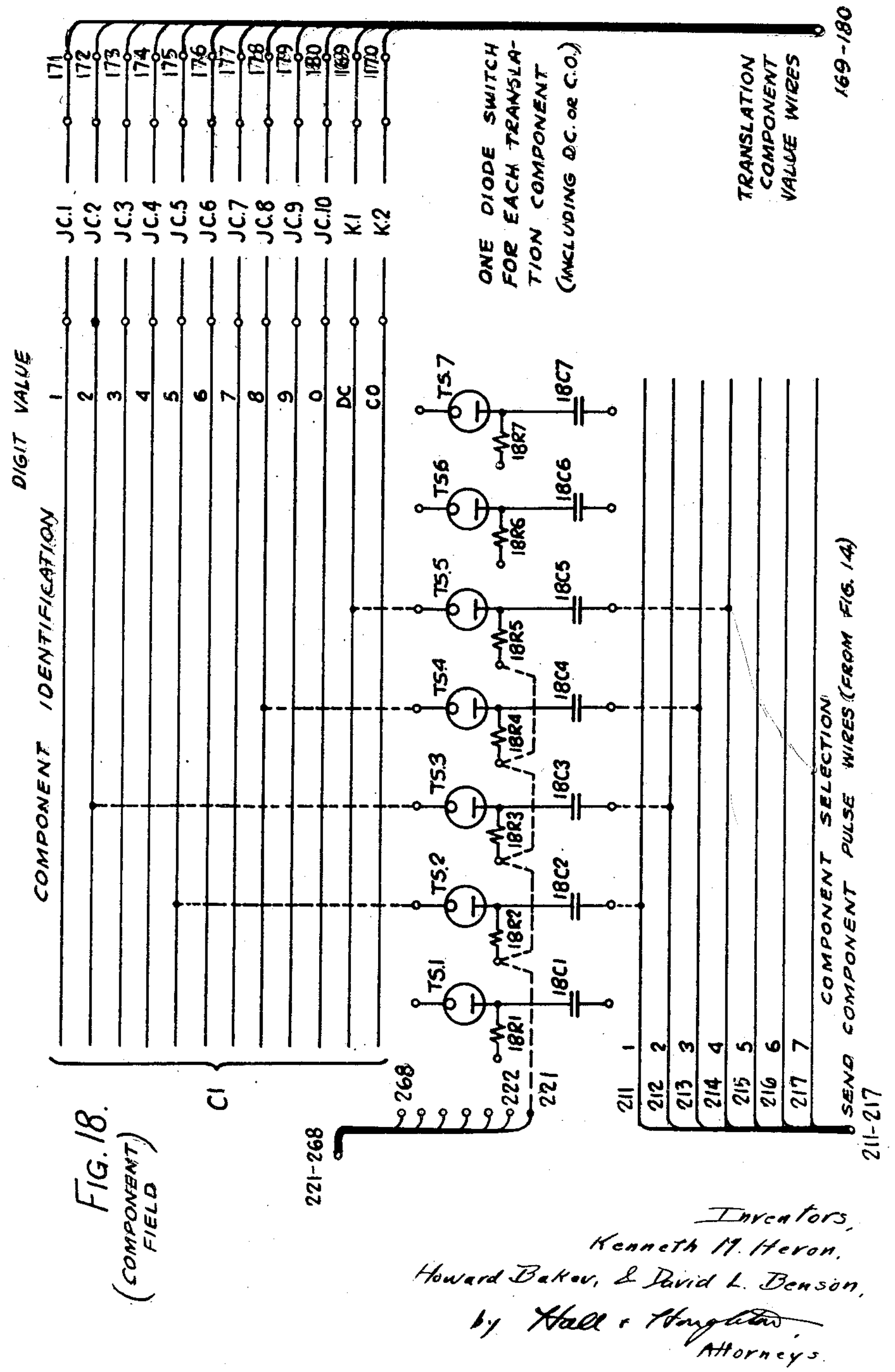

As is explained later, if a component offer pulse produces a coincidence signal, and if two previous coincidence signals have been recorded indicating that the code stored is that for which information is offered, then the register requiring such information, transmits a demand signal over lead 115 (Fig. 8) to the translator (Fig. 11), to record the particular translation train for which digital information is required. This information is stored in the translator, and no further translation offer signals are transmitted in the current cycle, a time interval being allowed to permit the sender gates (Fig. 6) to be opened by a pulse over wire 125 (Fig. 8) and, at the conclusion of the pulse cycle, the digital information required is transmitted as a pulse on one of the ten translational value component wires 171–180 (Fig. 18).

The receipt of digital information in the sender counter Fig. 6, causes the sequence counter step pulse generator valve B16 to transmit a positive pulse over lead 109 to the input circuits (Fig. 7) of each of the tubes 3–8, OD and M2–M6 from which tubes M3, M4 and M5 are omitted. Since the striker of tube L3 (Fig. 7) is biassed to earth potential from the cathode of L1 or L2, tube L3 strikes and L1 or L2 de-ionises. At this stage the sender has received digital information which it proceeds to transmit at 10 impulses per second and the second component tube L3 of the sequence counter has been energised. If during the period that the sender is off normal, a pulse is offered on component offer wire 202, a coincidence event is recorded over lead 117 but the recorder output is inhibited by B1 (Fig. 8) due to the sender off normal condition over lead 118 (Fig. 6). On each occasion that a pulse is applied on the sequence counter step wire 109 (Fig. 7) the tube next in higher order to the energized tube is struck. The exception to this case is concerned with those codes where the number of translation components necessary for routing the call, is less than the maximum available. In such cases when a demand is transmitted by the translator, for the train following the last routing train, the translator transmits a signal over lead 169 (Fig. 18) and this signal causes operation of the tube OD (Fig. 7). The tube OD is concerned with the facility of offering the D relay (Fig. 3) to the outgoing loop. The contact D1 (Fig. 3) of the D relay, if D does not operate, maintains the lead 111 at a positive potential, and with the inter digital pause normal, lead 121 at earth potential, and the OD tube energised, the striker of tube M2 (Fig. 7) is at earth potential.

When the sender counter (Fig. 6) is at normal, the transfer pulse generator valve B13 is permitted to gate "W" pulses out on to the "T" pulse wire 127 and through condenser 7C1 (Fig. 7) to the striker of tube M2. Thus the first transfer pulse raises the M2 striker to +40 volts and the tube energises. This tube is connected to control the thousands numerical gate tube M8, which when opened will permit a "T" pulse to be transmitted from lead 127 to the thousands transfer wire 132 and thus cause the digital information stored in the thousands counter to be transferred to the sender counter providing that lead 102 (Fig. 4) is at earth potential.

A facility necessary in connection with numerical transmission is that a numerical train must be delayed until the succeeding incoming impulse train from the subscriber has commenced. Thus the thousands numerical train must not be transmitted until the subscriber commences to dial the hundreds numerical digit. This facility is obtained by making the thousands gate MB, dependent upon the incoming distributor as well as the outgoing sequence control. Thus gate MB cannot open until tube M2 (Fig. 7) and also tube VC9 (Fig. 4) are both energised. The tubes M3, M4 and M5 which have not been shown have circuits similar to tube M2 and control the opening of gates M9, M10 and M11 respectively to effect transfer of the hundreds, tens and units digital information received over leads 103, 104, and 105 (Fig. 7) from tubes VC10, VC11 and VC7 respectively of Fig. 4. Tubes M9 and M10 are similar to M11. The final pulse from the sequence counter step pulse generator valve B16 (Fig. 6) over 109 strikes tube M6, which is concerned with register release. On operation, the cathode of tube M6 rises to earth potential and over lead 107, raises the striker of tube N6 (Fig. 9) to earth potential (providing that lead 121 (Fig. 9) is at earth potential) and permits a pulse applied over lead 113 (Fig. 3) to fire tube N6.

(*f*) *Spare code introduction*

The cold cathode tubes L2, M1 and M12 in Fig. 7 are provided to record that the translator has offered all the available codes without the register achieving coincidence. In this case the normal facilities for "spare code" apply and the register is required to send a train of ten impulses and at the conclusion of the train to apply an earth signal to the outgoing FR wire (Fig. 3). The translator offers codes cyclically, and coincident with the transmission of a particular code, which would normally be the first code offered when the translator was started from rest conditions, a pulse would be applied to the SC pulse lead 157 (Fig. 7). This pulse would be applied to the corresponding lead in each register, on every occasion that the particular code was offered i. e. once per code cycle. Any register receiving two such pulses without recording code co-incidence can introduce the "spare code" facility.

It is assumed that a register has stored exchange code digits and is waiting to be offered translation train number one in respect of the stored code. On receipt of a positive signal on the "SC pulse" lead 157 (Fig. 7) the striker of tube L2 is raised to striking potential by reason of the bias applied from the cathode of the operated tube L1, which is then de-ionised. Tube L2 maintains the bias on translation offer wire 201, and assuming that co-incidence is achieved in the current code cycle, tube L2 is de-ionised on operation of tube L3 consequent upon receipt of a step-on pulse from the sequence counter step pulse generator B16 Fig. 6. If however tube L2 is still energised upon receipt of the second pulse on the SC pulse lead 157, which inaugurates the commencement of the next code cycle, then this pulse strikes tube M1 which is favourably biassed for operation by the cathode potential of tube L2. The rise in potential at cathode of M1 permits a "T" pulse to be transmitted via lead 123 (Fig. 7) which terminates on the striker of tube K11 in Fig. 6. The sender under control of the send impulse generator valve B17, proceeds to transmit a train of ten impulses at 10 impulses per second and as the K1 tube de-energises at the commencement of sending, a signal is transmitted on the sequence counter step wire, which raises the striker of tube M12 to +40 v. and causes the tube to ionise. The rise in potential at the cathode of tube M12 permits a T pulse generated when the sender returns to normal (K1, Fig. 6, energized) to be transmitted out over lead 116 to fire tube N4 (Fig. 9) thus causing valve A16 to operate relay M which at contact M1 (Fig. 3) causes the earth signal to be connected to the outgoing FR wire.

(*g*) *Code only responses*

It is a feature of the known director networks that certain services are available by dialling a code without subsequent numerical information. Services such as Operator (dial O), Trunks (dial TRU) and TIME (dial TIM) are examples and the electronic register embodying the present invention is arranged to provide such facilities. It is arranged that when a register initiates a demand signal for a translation component following the last routing train, the translator returns a signal on the code only lead 170 (Fig. 7) which causes operation of the register release tube M6. Thereafter the cleardown cycle is as for a normal call with numerical trains.

(*h*) *Coincidence recorder* (*Fig. 8*)

The co-incidence counter which is shown in Fig. 8 utilises two pairs of hard valves B4 to B7 arranged as a binary counter. A positive signal on the co-incidence lead 117 indicates an event and causes the potential of grid (L) of valve B2 to become positive so that the anode (L) conducts. The reduction in volts at anode (L) produces a negative going signal at the condensers 8C1 and 8C2 in the leads to the suppressor grids of valves B4 and B5. These condensers are each held at a reference potential dictated by the condition of the associated anodes to which they are connected by resistors 8R2 and 8R3 respectively. Thus assuming the anode of valve B5 to be conducting, that of B4 to be non-conducting, and the negative signal to be of 60 volts amplitude, then the potential at the rectifier 8W1 connected to the suppressor grid of B4, falls to +40 for the duration of the negative pulse, and since under these conditions the rectifier cannot conduct, the suppressor grid remains at earth potential. Valve B5 however, being in conducting state, the anode and thus the reference potential of the suppressor condenser will be at approximately +10. Then the negative going pulse will cause the potential at the rectifier 8W2 in the line to the B5 suppressor grid to fall to 50 volts, the rectifier to conduct and to cut off the anode of valve B5. The rise in anode volts causes the potential of the control grid of valve B4 to become positive and thus valve B4 conducts. The screen grid of valve B5 is connected via condensers 8C3 and 8C4 to the suppressor grids of valves B6 and B7 respectively and a negative pulse is thus produced at the suppressor grid of the particular valve of the pair (B6 or B7) whichever is conducting, when the screen grid potential of valve B5 falls. The reset lead 156 incoming to the suppressor grids of valves B4 and B6 conveys a negative pulse P1 from the translator at the commencement of each translator cycle offering a new BC code, to restore the coincidence counter to normal.

The sequence of events is that on receipt of the first coincidence signal, following a reset pulse, valves B4 and B7 conduct, at the second pulse, B5 and B6 conduct, and with the third pulse B4 and B6 conduct. Three such co-incidence events in a cycle indicate that the translator has offered the required translation train for the code stored in the register, and require that the register should:

(*a*) Transmit a demand signal to the translator and (*b*) Open the gates between the incoming component valve wires 171—180 (Fig. 6) and the sender counter.

Figures 11, 16:
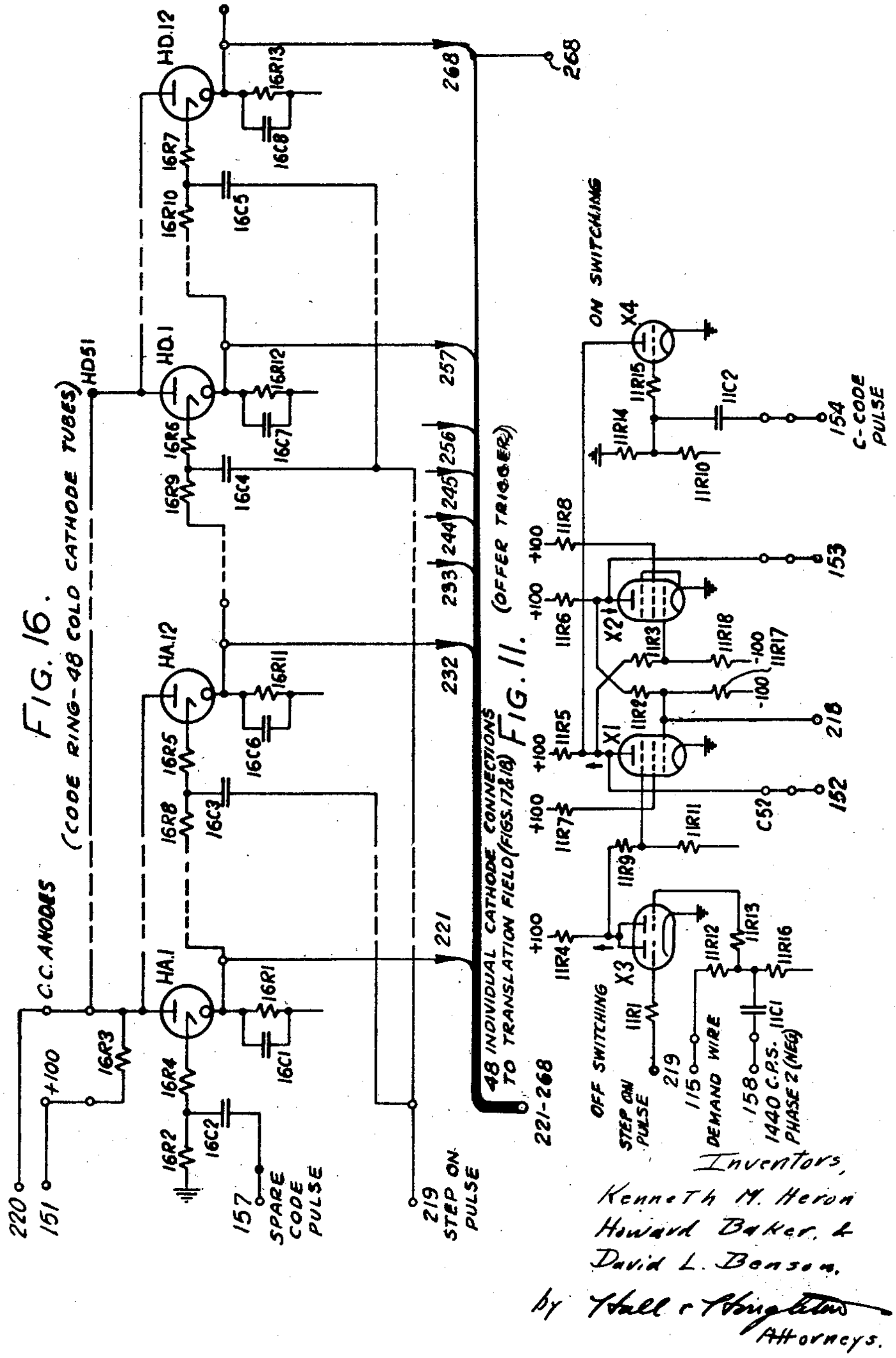

Conditions (*a*) and (*b*) are both controlled by the cathode follower B11 (Fig. 8). The grid of B11 is normally held at −35 volts approximately under control of the anode (R) of valve B2 which is coupled by condenser 8C5 to the control grid of valve B11. Thus the cathode potential of valve B11 is sensibly the same as the grid and this potential is applied over lead 125 to the common gate wire of the sender counter (Fig. 6) and prevents the operation of the sender counter tubes to pulses on the component value wires. With three co-incidence events recorded valves B4 and B6 are conducting, and the anodes are coupled via resistors 8R6 and 8R7 to the grid (R) of B2. This grid (R) is also controlled by the condition of the anode of valve B1 to which it is connected via resistor 8R8. Thus, when B1, B4 and B6 are all conducting the grid (R) of valve B2 cuts off the anode (R), and this rise in potential causes the grid of valve B11 to rise to earth potential, to which potential approximately it is followed by the cathode which raises the potential of lead 125. The coupling condensers 6C1–6C10 in the translational value wires 171–180 (Fig. 6) of the sender counter are then at earth potential due to the earth potential on lead 125 and a positive pulse on one of the wires 171–180 raises the potential of the striker of the associated tube K2–K11 and the tube conducts. The positive potential change at the cathode of valve B11 is also responsible for a signal via rectifiers 8W5 over the demand wire 115 into the translator (Fig. 11).

The potential fall at the anode of valve B1, when both control and suppressor grids are biassed appropriately from the circuits indicated, is extended via a decoupling rectifier 8W6 out onto the start wire 114, to cause the translator (Fig. 15) if at rest, to start to offer the available code and translation information. The valve B1, serves to combine the signals from the sender counter (Fig. 6) over lead 118 and the sequence counter circuit (Fig. 7) over lead 120 to control the start and demand signals and inhibit the opening of the sender counter gates should either the sender be off normal or the tubes L1–L8 in the sequence counter (Fig. 7) be de-ionised.

It will be apparent from the aforedescribed operation of the circuits of Figs. 6, 7, and 8, that a register requiring a translation of a particular code receives a portion of the complete translation on each presentation of the code translation to the register until the complete translation is received by the register, and that a register requiring an item of a code translation which occurs earlier in the offering cycle than items required by other registers will transmit a demand signal to the translator as soon as an interrogating signal corresponding to the required item is received from the translator over the component offer wires and the required item is transmitted to the register at the end of the time allotted to the said code. After the required item is received by the register, the code offering sequence is stopped to enable the items of the code translation occurring later in the offering cycle to be offered to the said other registers.

The register equipment circuit details shown in Fig. 9 comprise the inter-digit pause timer, the clear down control, the forced release circuit and various relay controls and an H. T. monitor circuit.

(*i*) *Inter digit pause facility* (*Fig. 9*)

The inter-digit pause facility is furnished by cold cathode tubes N8 and N9. Upon register seizure, tube N8 is fired over lead 128 from the cathodes of valves A11, A12 (Fig. 3) and the condenser 9C1 commences to charge to the potential across the cathode resistor 9R1 via the non-conducting series rectifier 9W1 which is shunted with a stabilising resistor 9R2. The potential on the condenser 9C1 is used to control the reference potential of the striker of tube N9 via the decoupling resistor 9R3 and to gate the recurrent "W" pulses applied over lead 208. Thus the +40 volts "W" pulses are additive to the potential due to the condenser 9C1 and at a point in the time constant equivalent to 650 milliseconds +50 milliseconds, the striker of tube N9 reaches the breakdown potential, tube N9 ionises and N8 de-ionises. Tube N9 ionised is the normal condition and if N8 is caused to ionise, then the time period that elapses before N9 again ionises is used as the inter-digital pause period.

(*j*) *Clear down control* (*Fig. 9*)

Referring now to the clear down control, the conditions of register release are varied, the more important conditions to be met being as follows:

(*a*) Normal register release following a code only or code plus numerical routing, (*b*) Release due to time out conditions when the register has been held for a period between 30 and 60 seconds, (*c*) Release due to "spare code" conditions, (*d*) As for (*b*) but with the register connected to a junction on which reverse positive and negative conditions exist.

The tubes N1, N2, N4 and N6 are provided to control the conditions of release to be applied, depending upon which of the conditions in categories *a–d*, above exists. Thus on register seizure, tube N1 is ionised due to the seizure pulse applied over lead 128 and the potential at the cathode is applied to the suppressor grid of valve B14, which is a conventional arrangement of a Miller integrator circuit. The circuit constants provide that on anode voltage run down of valve B14, the time taken to cut-off the anode (L) of valve B15, to the control grid (L) of which the anode of valve B14 is connected, is of the order of 40 seconds. Therefore if tube N1 remains energized for a period of 40 seconds, the anode (L) of valve B15 is cut-off at the expiration of this time. The resultant increase in potential at the junction point of the potentiometer composed of resistors 9R4 and 9R5 permits "Y" pulses applied from the translator (Fig. 19) over lead 210 to raise the striker potential of tube N2 to a value sufficient to ionise the tube. The cathode of tube N2 rises to approximately earth potential which is applied to the grid of valve A17, causing relay PU to operate. The contact Pul (Fig. 3) of this relay disconnects the loop connection between the positive and negative outgoing wires. The next "Y" pulse raises the potential of the striker of tube N4, but because of the short pulse duration (200 microseconds) and the long time constant of the striker circuit composed of condenser 9C2 and resistor 9R6, the potential rises slowly, and it requires approximately eight "Y" pulses before the striker reaches the operative potential. Thus there is a delay of 800 milliseconds approximately (8 pulses of "Y" at 100 milliseconds intervals) between operation of relay PU and operation of relay M which at its contact M1 (Fig. 3) applies earth to the outgoing release trunk TR. Relay M is connected in the anode circuit of valve A16, which conducts due to the rise in grid potential consequent upon ionisation of tube N4 the cathode of which is connected to the grid of valve A16 via resistor 9R7. A delay of 800 milliseconds between the opening of the outgoing loop wires and the operation of relay M to earth the FR wire is a standard facility in the known system, and ensures that if an outgoing junction is held at the time of release, this is guarded for 800 millseconds following the opening of the loop. The next "Y" pulse which occurs 100 milliseconds after the operation of tube N4, causes tube N6 to ionise, and the rise in potential of the cathode, is communicated to the grid (R) of valve B15 through resistor 9R8 and rectifier 9W2 which causes the anode (R) to conduct. The resultant decrease in voltage at anode (R), causes a reduction in the current in the cathode load of valve A14 comprising resistor 9R9 and the relay CO/1 which releases and at its contact CO1 opens the incoming P wire (Fig. 3).

The release of the associated A digit selector and 1st code selector from the register is identical with the known conditions. The busy key BK which is provided on each register provides a convenient means for "busying" the equipment against seizure when it is required to carry out maintenance tests. The time pulse cut out key TP (Fig. 9) by earthing the screen grid of the Miller integrator valve B14, renders the time pulse "throw out" facility inoperative, and permits prolonged examination of the circuit beyond the normal limiting period.

(*K*) *Fault monitoring*

The electronic register utilises +200, +100, −50, −100 volt supplies and 6.3 volt A. C. for the heaters of hard valves. Interruption of any one of those supplies would cause the equipment to fail, and if safeguards were not adopted, would cause a calling subscriber either to obtain access to a register which would not give service, or if the subscriber should be connected at the instant of failure, to remain locked to the faulty equipment. A monitoring facility is therefore provided by the valves A14 and the triode (R) of B15 of Fig. 9. Failure of any of the +200 volts at the anode of A14, or the +100 volts which feeds the grid of A14 via resistor 9R10 or the 6.3 volt heater supply, would cause the relay CO in the cathode circuit of A14 to release, and at CO1 (Fig. 3) to mark the register busy. The −50 volt and −100 volt supplies are monitored on the grid (L) of B15, which in the event of failure of either supply becomes sufficiently positive to cause the anode (R) to conduct. This in turn reduces the grid potential of the cathode follower valve A14 which causes relay CO to release. This relay in its unoperated position is connected to control a register alarm lamp LP (Fig. 3) which can be connected to operate the appropriate section alarm.

VI. TRANSLATOR SUB-COMBINATIONS (FIGS. 2 AND 10–19)

Reference will now be made to Figs. 10 to 19 of the drawings which show the circuit details of the translator. The primary source of switching pulses is constituted by a normal form of multivibrator MV (Fig. 10) comprising screen grid tubes and running at 1440 cycles per second and which controls the speed of the complete system. The screen grid of each tube is used to trigger pulse shaper circuits comprising tubes V3, V4 and V5, V6 respectively so generating a two phase 1440 P. P. S. supply. The pulses are of 200 microseconds duration repeated every 700 microseconds and positive or negative going pulses can be obtained from each phase.

Figure 10:
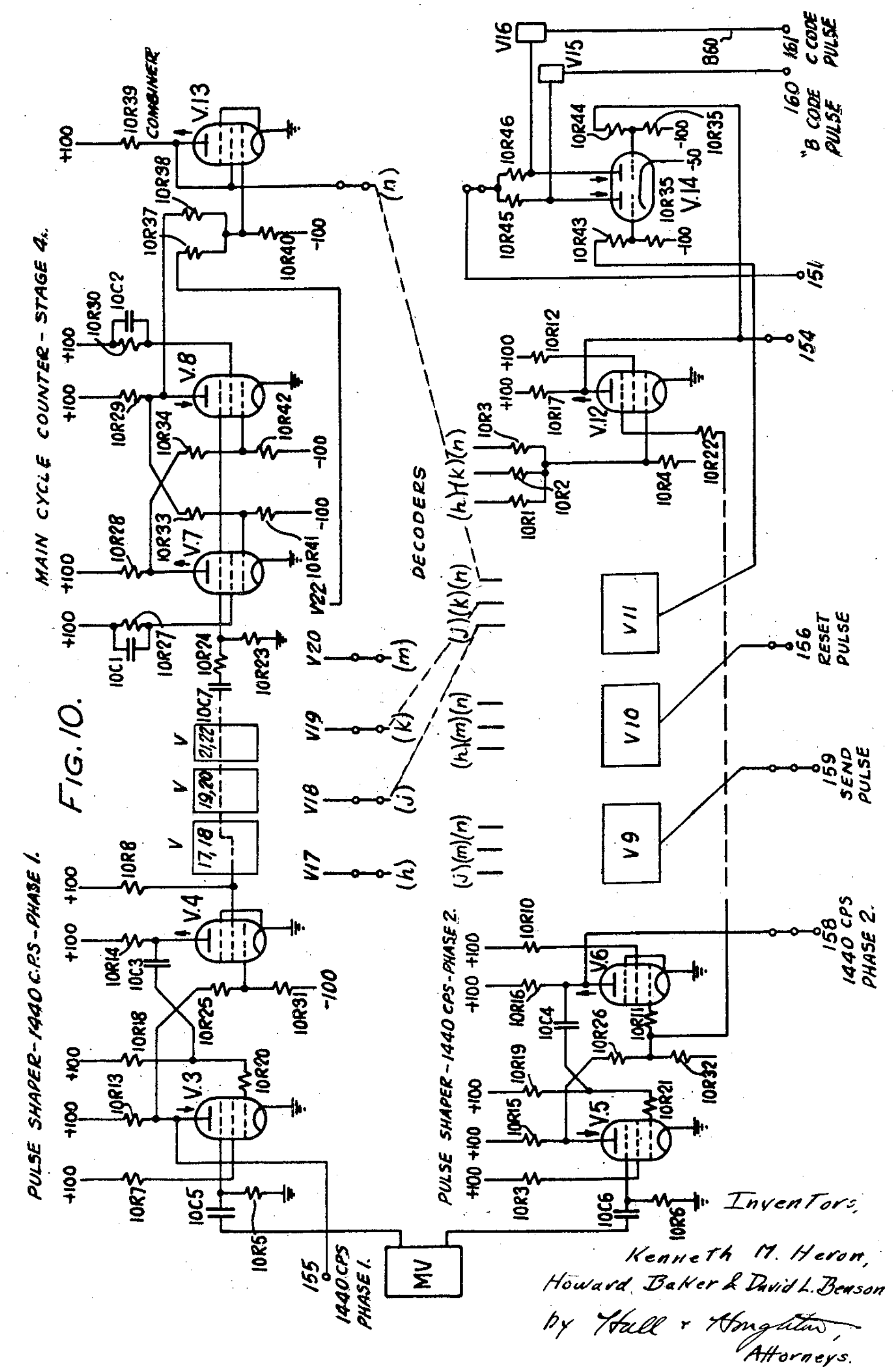

(*a*) *Main cycle counter* (*Fig. 10*)

The main cycle counter is a four stage binary counter (scale of 16) of which only the final stage is shown comprising an improved binary circuit in which the incoming pulse is applied to a suppressor grid of both tubes V7, V8 and a capacitor 10C1, 10C2 is connected to the tube screen in each case. With the conventional binary circuit the capacitor is connected between the anode of one tube and the grid of the other tube. This latter form of connection has the effect that if a spurious signal is applied to the anode of a tube which is not conducting the spurious signal appears on the grid of the other tube and a negative signal of as little as one volt will cause the binary pair to operate. In the present translator it is desired to connect the anode circuits for decoding purposes and this causes crosstalk from one binary pair into another. With a conventional binary circuit this causes mis-operation and the improved circuit was designed to produce an insensitive anode. This results in slower speeds of operation but a speed of 2 kilocycles per second is all that is desired in the present translator.

In the operation of the binary circuit shown in Fig. 10, the screen grid of the tube which is conducting will be at a potential of about +45 volts and the screen grid of the non-conducting tube will be at +100 volts and the capacitors will retain these potentials during changeover. The negative signal coming into a stage is suitably proportioned and applied to the suppressor grid of both tubes which are connected together. This signal momentarily cuts off anode current in both tubes and as the negative signal dies away exponentially the tube with the screen grid at +100 volts takes precedence over the tube with the screen grid at +45 volts thus effecting a changeover.

(*b*) *Main cycle decoder*

Four main cycle decoding tubes V9–V12, of which only one V12 is shown because the others have similar connections, are provided to detect four consecutive conditions of the main cycle counter and to generate a 200 milliseconds pulse during each condition. Each resultant pulse will occur at one sixteenth the basic speed of 1440 cycles per second, that is to say at 90 cycles per second and the four pulses are identified as follows:

| Tube | Pulse title | Counter position | | | |
|---|---|---|---|---|---|
| V9 | send pulse | 0 | 0 | 0 | 0 |
| V10 | reset pulse | 1 | 0 | 0 | 0 |
| V11 | B code pulse | 0 | 1 | 0 | 0 |
| V12 | C code pulse | 1 | 1 | 0 | 0 |

It will be observed that in each case the third and fourth binary stages are in the same position and to ease decoding the outputs of these two stages are combined by tube V13 which is non-conducting when both stages three and four are "normal." Each decoding tube has a four leg resistor network connected to the grid and comprising resistors 10R1, 10R2, 10R3, 10R4. These resistors provide three control points which are connected to (1) the appropriate anode of stage one (2) the appropriate anode of stage two and (3) the anode of tube A23 which combines stages three and four. The letters *h, j, k, m* and *n* serve to indicate these connections. The resistor network is arranged so that the grid of the appropriate decode tube is held negative unless all three control points are raised in potential. By neglecting the suppressor grid conditions, and observing on the screen grid, the decoding tube will be conducting for one period of 700 microseconds and non-conducting for the next fifteen periods of 700 microseconds. Nominal voltages are:

Binary anodes, when non-conducting +78 volts, when coducting +12 volts.

Combiner tube A13, when non-conducting +90 volts, when conducting +12 volts;

Grid of decode tubes, conducting +3 volts (neglecting grid current), non-conducting —10 volts (or more negative).

The suppressor grids of the decoding tubes are connected to phase two (tubes V5, V6) of the 1440 cycles per second source being —23 volts for 500 microseconds, and +5 volts for 200 microseconds. Therefore a 200 microseconds negative pulse is produced on the anode of a decoding tube midway in the 700 microseconds period mentioned.

Tube V14 inverts the B and C code pulse to positive pulses, the anode of the B code decode valve V11 (not shown) being connected to the control grid (L) of valve V14 and the anode of the C code decode valve V12 being connected to the control grid (R) of valve V14. The anode supply is a controlled +100 volts and the cathode of tube V14 is connected to —50 volts because the controlled +100 volts is stabilised with respect to —50 volts. Thus the output pulse amplitude from tube V14 is almost fully dependent on the controlled +100 volts supply. V15 and V16 represent cathode follower output tubes with output leads 160 and 161 for the B and the C code pulses respectively and do not cause any appreciable amplitude distortion. The final pulse amplitude is 45 volts.

(*c*) *Offer trigger* (*Fig. 11*)

The offer trigger shown in Fig. 11 comprises tubes X1 and X2 and is switched on from lead 154 via tube X4 at the end of the C code pulse and is switched off via tube X3 by either a demand signal from a register applied to lead 115 or by a step-on pulse (indicating the end of a secondary cycle) applied to lead 219. This switching sequence is achieved as follows:

(*a*) The positive trailing edge of a C code pulse (from the anode of tube V12, Fig. 10) over lead 154 is applied to the grid of X4, which conducts momentarily and forces the trigger to turn "on."

(*b*) It is turned "off" either by a step on pulse received from the secondary cycle counter over lead 219 causing tube X3 to give a negative signal on the suppressor grid of tube X1 or by a demand signal from a register (Fig. 8) over lead 115 which changes the potential of the demand wire from —35 volts to earth, causing the grid bias tube X3 (RH) to change from —41 volts to —9 volts thus allowing the trailing edge of a 1440 C. P. S. phase 2 negative going pulse over lead 158 to make tube X3 conduct and give a negative signal to the suppressor grid of tube X1. The demand signal is always the result of a 1440 C. P. S. phase 2 pulse and it is required that the offer trigger shall turn off at the end of the same 1440 C. P. S. phase 2 pulse during which a demand is signalled.

Figures 12, 13:
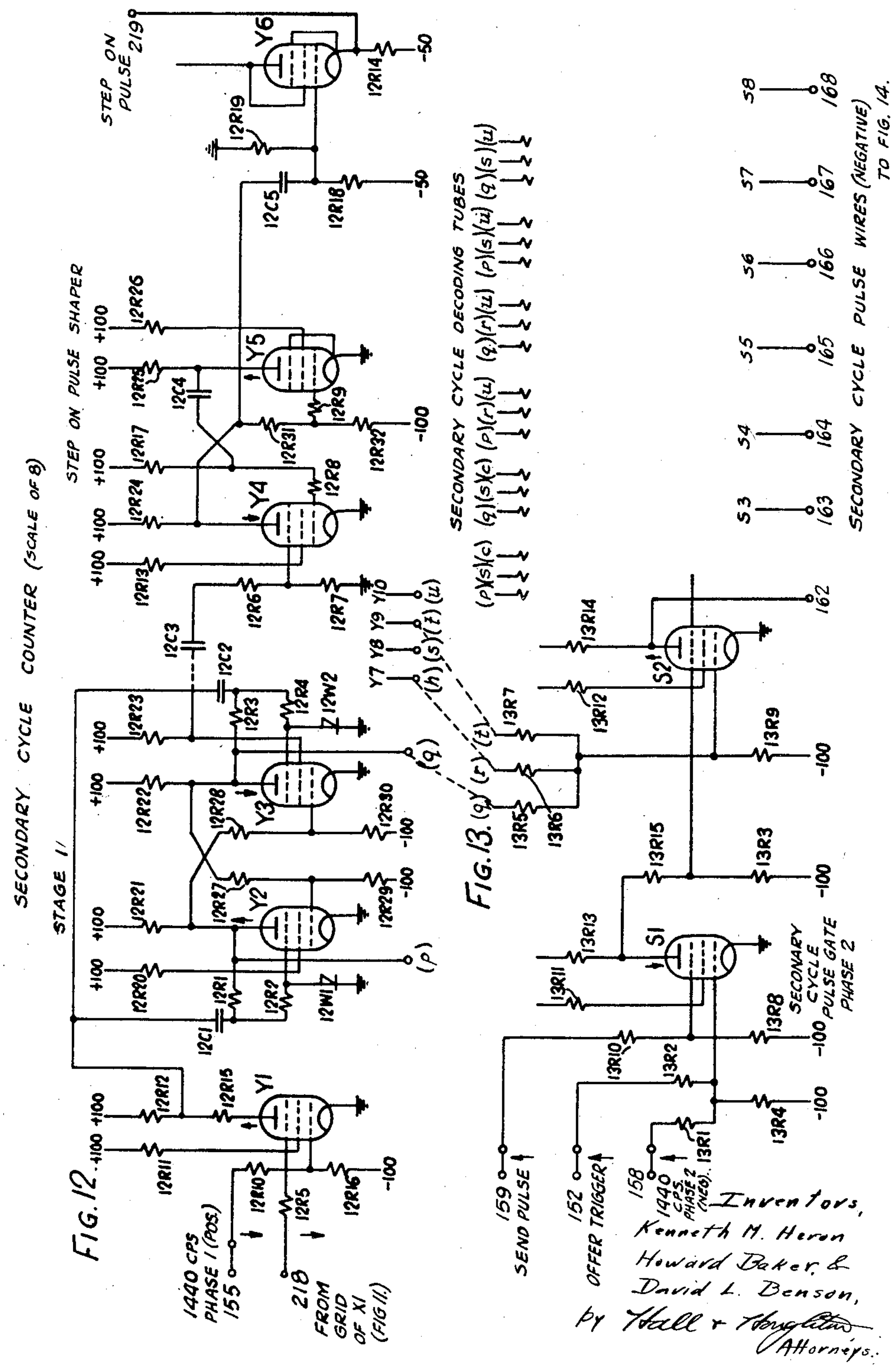

(*d*) *Secondary cycle step gate* (*Fig. 12*)

The secondary cycle step gate is a straightforward pentode tube gate Y1 shown in Fig. 12 controlled at the suppressor grid by the offer-trigger switch-off tube X1 (Fig. 11) the control grid of which is connected over lead 218 to the suppressor grid of tube Y1. This tube is also controlled at the control grid by the 1440 cycles per second, phase 1 positive pulses from Fig. 10 applied over lead 155 so that phase 1 negative going pulses appear at the anode while the offer trigger is off normal.

(*e*) *Secondary cycle counter* (*Fig. 12*)

The secondary cycle counted is a three stage binary counter (scale of 8) and comprises another improved counter circuit shown in Fig. 12. Only the first of three stages is shown comprising two pentode tubes Y2, Y3 which are cross connected to form a gated input pulse trigger pair. A resistor pair 12R1 plus 12R2 and 12R3 plus 12R4 connect the respective anodes to the suppressor grids of each tube and rectifier 12W1, 12W2 (germanium diodes with high reverse impedance characteristics) prevent the suppressor grids going positive in potential. The incoming pulse from the anode of tube Y1 is applied through capacitors 12C1, 12C2 to the junctions of the resistors 12R1, 12R2 and 12R3, 12R4. Each anode switches between +77 volts and +12 volts so that the junction of the associated resistors and the capacitor will be +38 volts in the case of a non-conducting tube and +6 volts in the case of a conducting tube.

The positive front of the incoming signal has no effect on the circuit as the rectifier prevents a positive potential change from reaching the suppressor grid. The negative front of the incoming signal (about 40 volts) causes a non-conducting tube to have the potential of the suppressor grid pulsed down to +38—40=—2 volts via its associated resistor, and this has a negligible effect. A conducting tube has the potential of the suppressor grid pulsed down to [+6—40=]—34 volts via its resistor and this cuts off the anode current causing the trigger to change over. Thus the changeover is a trigger action and the signal passed to the next stage, being connected from a screen grid, has a good square waveform.

The third, last, counter stage is coupled by capacitor 12C3 to a stop-on pulse shaper circuit comprising tubes Y4, Y5 and the shaper circuit drives a cathode follower output tube Y6. The step-on pulse which is taken from lead 219 therefore marks the end of a secondary cycle. The pulse duration is a nominal 200 microseconds, the output amplitude is approximately 50 volts and the pulse can be considered to be concurrent with a 1440 cycles per second phase 1 pulse, although in fact it occurs a few microseconds later.

(*f*) *Secondary cycle pulse gate* (*Fig. 13*)

The secondary cycle pulse gate tube S1 is shown in Fig. 13 and permits positive pulses to appear at the anode from:

(*a*) A send pulse (injected on the suppressor) over lead 159 from Fig. 10 or (*b*) 1440 cycles per second phase 2 pulses from the offer trigger (Fig. 11) when off normal which are injected on the grid of S1 over lead 152 and from V6 of Fig. 10 over 158.

The output is connected to the suppressor grids of all the secondary cycle decoding tubes of which seven, S2, S3–S8, are provided to decode all except the "normal"

positions of the secondary cycle counter. Only one of the tubes, viz. S2, is shown because the others are identical, but the control wires are indicated and identified by reference letters to show how they are cross connected to the secondary cycle counter (Fig. 12). Operation is similar to the main cycle decoding tubes. Appropriate grid potentials are as follows:

Tube conducting________ +4 (neglecting grid current).
Tube non-conducting_____ −9 (or more negative).

The action of these tubes is such that the send pulse and the offer pulses appearing on the output of the secondary cycle pulse gate (tube S1) is distributed to seven secondary cycle pulse wires 162 to 168 according to the condition of the secondary cycle counter when the pulse occurs.

*(g) Translator switching and output pulsing means (Fig. 14)*

Figure 14:
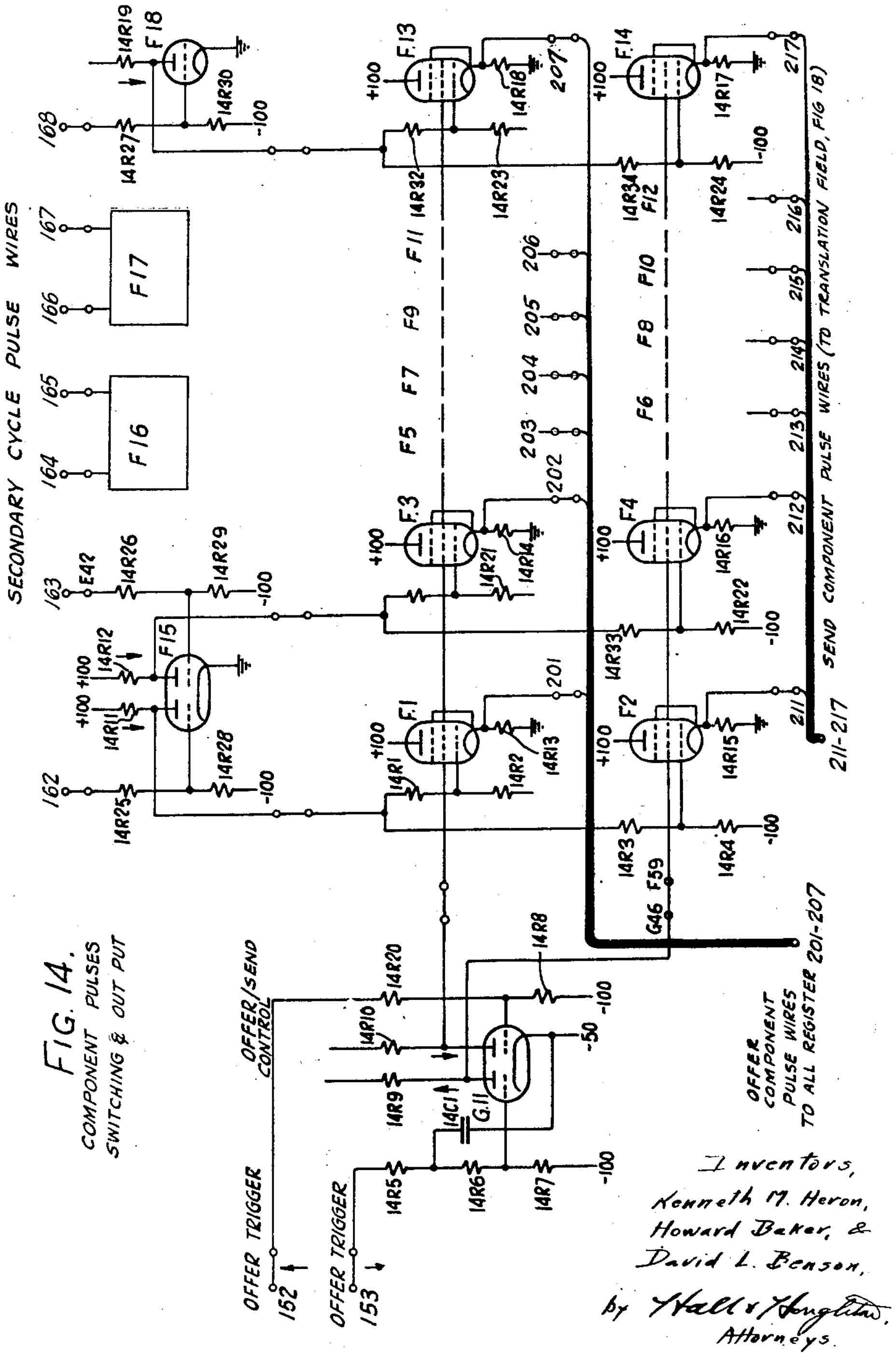

The circuits providing the translator switching and output pulses are shown in Fig. 14. Fourteen pulse outputs are required—seven offer component pulse wires 201–207 connected to the sequence counters (Fig. 7) of all registers and seven send component pulse wires 211–217 connected to the translation field (Fig. 18). To economise in tubes it has been found possible to make the fourteen cathode follower output tubes used act as gates requiring two input signals (one on the screen grid and one on the control grid) and arranged in crossbar fashion. The tubes are arranged in two groups of seven of which only the first and second and the seventh tube in each group are shown. Thus tubes F1, F3 and F13 constitute the first, second and seventh tubes in the first group and tubes F2, F4 and F14 constitute the first, second and seventh tubes in the second group. In each group the seven screen grids are commoned together. Tube G.11 (offer/send control) controls the screen grid supply for the two groups, which consists of +100 volts fed through resistors 14R9, 14R10. This supply is shunted down to approximately −10 volts in the case of the group which is blocked and is left free in the case of the group which is marked. Tube G.11 is controlled over leads 152, 153 connected to its control grids, by the offer trigger (Fig. 11) such that when the offer trigger is normal the RH section of G11 is conducting and the seven offer component cathode follower tubes F1, F3 . . . F13 are blocked. When the offer trigger is off normal the LH section of G.11 is conducting and the seven send component cathode follower tubes F2, F4 . . . F14 are blocked. The pulses on the seven secondary cycle pulse wires 162 to 168 (Fig. 13) are inverted by tubes F15 to F18 of which F16 and F17 are not shown and each anode (which is normally conducting) is connected by a suitable potential divider comprising, for example, resistors 14R1, 14R2, 14R3 and 14R4, to the grid of the two cathode follower tubes (e. g. F1, F2), that is to say, one in each group of seven, so that these grids are normally held just negative. When a negative pulse appears on one of the seven secondary cycle pulse wires, it will result in a positive pulse on the grid of the corresponding two cathode follower tubes. One of these tubes will have a screen potential of about −10 volts and therefore only grid current affects the cathode output (about a five volt pulse which cannot cause mis-operation). The other tube will have a screen grid potential of +100 volts and therefore the tube acts as a cathode follower permitting a positive pulse to appear on the output wire. This pulse is of approximately 40 volts amplitude in the case of offer pulse and 45 volts amplitude in the case of send pulses.

*(h) Code ring H. T. trigger circuit (Fig. 15)*

Figure 15:
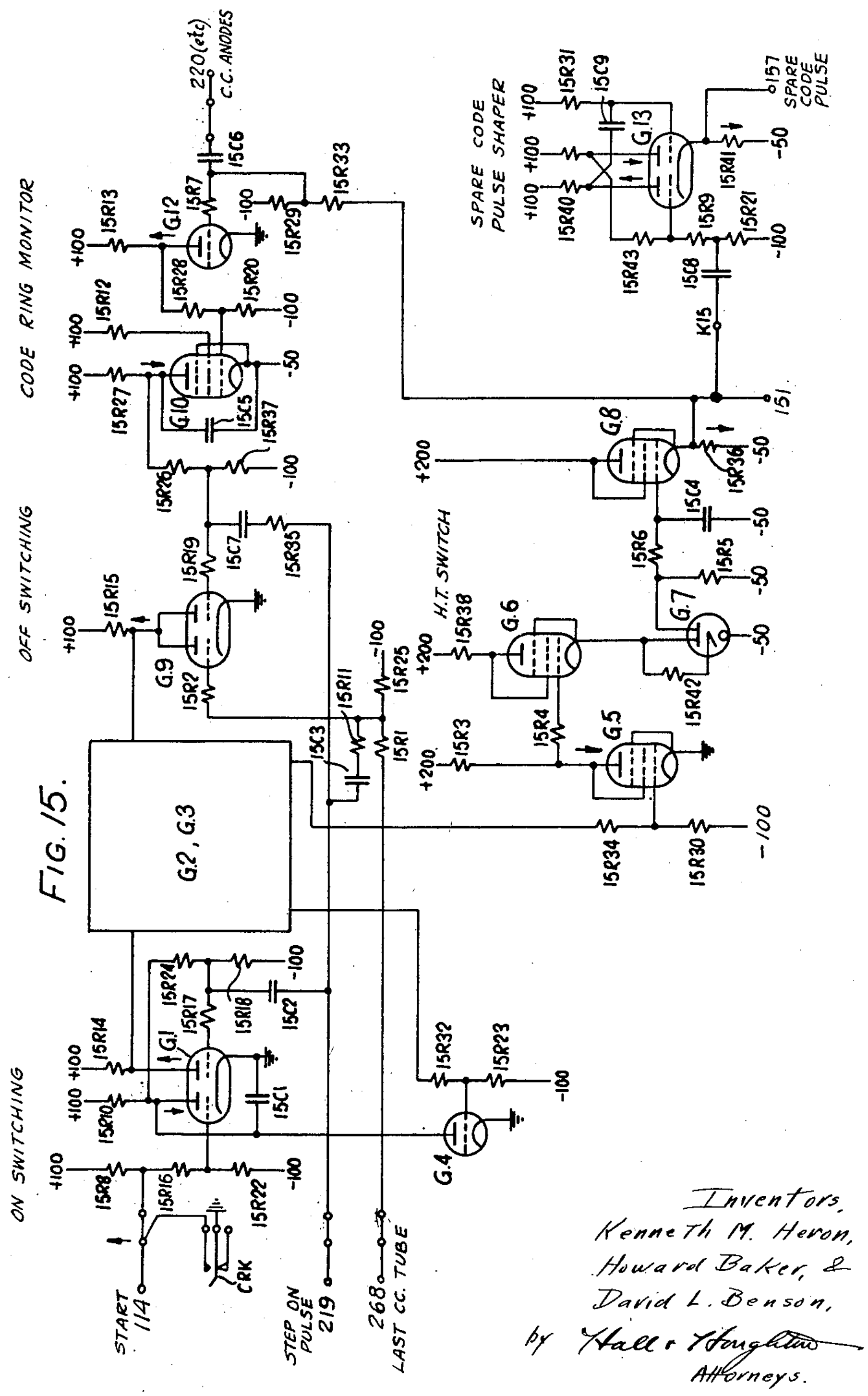

A trigger circuit for controlling the H. T. supply to the code ring hereinafter described with reference to Fig. 16, is shown in Fig. 15. The code ring is a cold cathode tube counter and is switched off during idle periods because (*a*) it is unnecessary to keep the counter continuously in operation (*b*) no difficulty is incurred in starting when required and (*c*) cold cathode tube life is extended. In addition, in view of the possibility of two cold cathode tubes conducting simultaneously, it is advisable to switch off the H. T. occasionally and restart with known conditions. This is done once every cycle of the code ring and gives rise to the definitions of first tube and last tube in the code ring.

In operation of the H. T. trigger circuit of Fig. 15 the start lead 114 (Fig. 8) potential is approximately +60 v. when there is no start condition and the LH section of tube G.1 (Fig. 15) is conducting. A start signal causes the start lead 114 potential to change to approximately +15 volts (or earth if the continuous run key CRK is operated), and the LH section of tube G.1 is cut off. The capacitor 15C1 between anode (L) and cathode of G1 provides for a condition in the register wherein a start signal is given slightly before the register is prepared to receive a spare code pulse. The capacitor 15C1 introduces a start delay to correct this condition. The positive change at the LH anode of tube G.1 is passed to the RH grid of the same tube and charges the capacitor 15C2 to −40 volts instead of −65 volts. A step-on pulse (50 volts positive) from the secondary cycle counter (Fig. 12) over lead 219 is superimposed on this potential by the capacitor 15C2 and causes a negative pulse to appear at the anode of the RH section of the tube G.1. This negative pulse is applied through capacitor coupling not shown to the suppressor grid of the first tube G.2 of a conventional two-tube trigger, not shown in detail, but represented by the block G2G3. This trigger is thus turned on so that this event is synchronised with a step-on pulse applied over lead 219. When the trigger G2, G3 turns on, the anode of tube G2 which is connected to the control grid of tube G4, causes the latter to conduct and tube G4 thus holds down the potential of the LH anode of tube G1 to prevent further "turning on" pulses reaching the suppressor grid of tube G.2. This is done so that the trigger can be turned off without the interference of a "turning on" pulse. The HT trigger controls the HT switch to be described later, and causes the code ring (Fig. 16) to operate. When the code ring counts to the last tube the potential on the LH grid of tube G9 which is connected to the said last tube over lead 268 changes from −63 volts to −21 volts. The potential from the last tube changes from −50 volts to +3 volts. Wire G50 is fed over lead 268 through resistors 15R1 and 15R2 to the control grid of tube G9. The next step-on pulse (11 milliseconds after the last tube commenced conducting) raises the grid potential of the grid (LH) of G9 via the capacitor 15C3 and causes the LH section of tube G9 to conduct. The consequential negative pulse produced at the anode of tube G9 is applied through a capacitor (not shown) to the suppressor grid of tube G3 and turns the HT trigger off. This in turn renders tube G4 non-conducting and after a delay introduced by the capacitor 15C1, if the start signal is still present on lead 114 the next step-on pulse will turn the HT trigger on again and the cycle of events will repeat. It will be noted that the HT is turned off for a period of 11.1 milliseconds, the time between step-on pulses, which is ample time for the cold cathode tubes to de-ionise and ensure known conditions when the HT is switched on again.

The HT switch which comprises tubes G5, G6, G7 and G8 shown in Fig. 15, supplies a potential of +100 volts (stabilised at +150 volts with respect to the −50 volt supply) while the HT trigger is on. While the HT trigger is off the supply is approximately +20 volts. In the operation of the HT switch when the HT trigger turns on, the anode of tube G3 which is connected to the control grid of tube G5, cuts off the latter and therefore the potential of the control grid of the tube G6 is determined by the resistors 15R3 and 15R4 through which it is connected to the +200 volts supply. Tube G6 when conducting connects the +200 volts supply to the stabiliser tube G7 which conducts at approximately 3 milliamperes and provides the stabilised potential. This potential is filtered by resistor 15R6 and capacitor 15G4 to eliminate the high potential which occurs for a short duration before the tube G7 is fully ionised, and applied to the control grid of the cathode follower output tube G8 which can supply about 10 milliamps of the controlled potential. When the HT trigger turns off, tube G5 conducts, reduces its anode potential to about +10 volts and this in turn reduces the cathode potential of G6 to about +15 volts and causes the stabiliser tube G7 to deionise and therefore not conduct during idle periods. The potential at the grid of the output cathode follower tube G8 changes from +100 volts to +15 volts and thus reduces the output potential to about +20 volts. The connections to the electrodes of tube G7 are such that if it is removed from its socket the output is switched off instead of being permitted to rise above the stabilised level.

(*i*) *Spare code pulse shaper trigger* (*Fig. 15*)

The spare code pulse shaper trigger-circuit includes tube G13 shown in Fig. 15. This double triode tube provides one pulse over its cathode output lead 157 every time the controlled HT is switched on and the pulse is employed to strike the first tube in the code ring as well as providing a signal to all registers for spare code identification. The LH section of tube G13 is normally cut off and any incoming negative signals have no effect. The positive signal created by the controlled HT switching on and taken from the cathode of tube G8 drives the LH section of G13 into conduction and turns the shaper trigger off normal. The shaper trigger stays off normal for a nominal 160 microseconds and then restores to normal. Operating voltages in this circuit may appropriately be as follows:

| | normal, volts | off normal, volts |
|---|---|---|
| Cathode | −30 | +10 |
| RH anode | −11 | +74 |
| LH anode | +100 | +40 |
| LH grid | −40 | +10 |
| Input capacitor | −59 | −25 |

The output pulse amplitude is therefore 40 volts positive. The positive signal which starts the pulse shaper trigger must be greater than 27 volts.

The code ring should step every 11.1 milliseconds approximately while the controlled HT supply is on except when a demand occurs which causes a step-on pulse to be deferred. The period between step-on pulses can be as long as 84 milliseconds but will rarely exceed 42 milliseconds. Each time the code ring steps correctly, a negative signal of 52 volts amplitude occurs at the anode common lead 220 (Fig. 16) of the cold cathode tubes and the signal will die away exponentially at a time constant of 1.7 milliseconds. Use is made of this signal to monitor the operation of the code ring so that if an anode pulse does not occur for a period of about 90 milliseconds while the controlled HT is on, the HT trigger will be turned off and a new code ring cycle initiated.

(*j*) *Code ring monitor circuit* (*Fig. 15*)

The code ring monitor circuit comprises tubes G10 and G12 shown in Fig. 15 and while the controlled HT is off, the monitor circuit is ineffective. The grid of tube G12 is biassed to —20 volts. Tube G10 is held conducting with the anode/cathode capacitor 15C5 discharged and the RH section of tube G9 is biassed to —64 volts so that the superimposed step-on pulses applied from lead 219 are ineffective. When the controlled HT is switched on the bias on tube G12 is altered due to the connection from the cathode of tube G8, to +28 volts (neglecting grid current) and G12 conducts. Tube G10 is biassed to —65 volts and the capacitor 15C5 charges up at a time constant of 180 milliseconds. Every time the code ring steps correctly the negative pulse occurring at the anode common is applied over lead 220 to the grid of tube G12 and results in tube G10 discharging the capacitor 15C5. If the code ring fails to step for 90 milliseconds the potential at the RH grid of tube G9 rises to a value at which the superimposed step on pulses cause tube G9 to conduct and turn off the HT trigger. The grid stopper resistor 15R7 of tube G12 permits the junction of this resistor and the capacitor 15C6 to rise to +16 volts and this ensures that noise over the cold cathode tubes anode common lead 220 does not reach the anode of tube G12, and also assists in the objective that only full anode pulses will discharge the capacitor 15C5.

(*k*) *Code ring* (*Fig. 16*), *and translation field* (*Figs. 17–18*)

The code ring is shown in Fig. 16 and consists of 48 cold cathode tubes HA1 to HA12, HB1 to HB12, HC1 to HC12 and HD1 to HD12 acting as a "one up" counter. For convenience, only the first, twelfth, thirty seventh and final tubes HA1, HA12, HD1 and HD12 respectively are shown, although the cathode leads of certain others are indicated at 233, 244 etc. The cathode of each tube is available as a potential source providing —50 volts when non-conducting and +3 volts when conducting. The first tube HA1 in the ring is struck by the spare code pulse applied over lead 157 from Fig. 15 and the last tube is de-ionised by the controlled HT being switched off from lead 151 (Fig. 15). The ring counts at a maximum speed of 90 steps per second.

The translation field circuits provide a permanent record of the information which may be required by the registers and comprise a code field, a part of which is shown in Fig. 17 and a component field, part of which is shown in Fig. 18. The code field comprises ten B code identification wires indicated at BCI and ten C code identification wires indicated at CCI, the said B and C code identification wires being commoned to every register served by the translator. Pairs of cold cathode diode switches TF1, TF2 etc. (typical of items 36, 37 etc. of Fig. 2) are connected on one side through capacitors 17C1, 17C4 etc. respectively to B code pulse lead 160 and C code pulse lead 161 over which B and C code positive pulses are transmitted from Fig. 10. Each pair of diode switches is also connected to the cathode of one of the code ring tubes of Fig. 16 there being as many pairs of diode switches as there are code ring tubes. Lead 221 in Fig. 17 represents the first of forty-eight individual cathode connections 221 to 268 to the respective code ring tubes and as will be seen, the connection is made to the same side of the diode switch to which the B or C code pulse wire 160 or 161 is connected. The other side of the diode switch of each pair which is connected to the B code pulse lead 160 is connected by a flexible strapping to a selected one of the ten BCI wires while the other side of the diode switch of each pair which is connected to the C code pulse lead 161 is connected by a flexible strapping to a selected one of the ten CCI wires.

The B and C code identification wires are terminated with a potential of —50 volts at pulse shapers indicated only by their identifying references JB1–JB10 and JA1–JA10. Each of the said pulse shapers is similar to the spare code pulse shaper G13 (Fig. 15) except that at the input a resistor of 560K ohms is connected to a —50 volts source to provide a terminating potential to the diode switch which is connected to the respective B or C code identification wire.

Because of the —50 volt termination, the diode switches of all the pairs, with the exception of the pair connected to a ring tube which is conducting, will have no D. C. potential across them and a B or C code pulse applied over lead 160 or 161 cannot strike the tubes because the pulse is less than 50 volts amplitude. The pair of diode switches connected to a ring tube which is conducting however will have a D. C. potential of 53 volts across each diode which will not strike the diode but if a B or C code pulse over lead 160 or 161 coincides with this condition, the pair of diode switches will strike and a pulse will be injected on to the B or C code identification wire to which each diode is strapped.

The component field, part of which is shown in Fig. 18 comprises twelve component identification wires indicated at TI, and seven component selection wires indicated at CSI. The twelve component identification wires are respectively connected to the ten translation component wires 171–180 (Fig. 6) and to leads 169 and 170 (Fig. 7) of all registers served by the translator while the seven component selection wires are connected to the send component pulse wires 211 to 217 of Fig. 14. The component identification wires terminate in pulse shapers JC1 to JC12 in a similar manner to that described with reference to the code identification wires of Fig. 17.

A plurality of diode switches TS1, TS2 etc. providing one diode switch for each translation component are each connected between a selected one of the component selection wires and a selected one of the component identification wires by flexible strappings indicated in broken line. Each of the 48 individual connections 221–268 from the code ring tubes is connected to one or more of the diode switches TS1, TS2 etc. through resistances 18R1, 18R2 etc. connected between a condenser 18C1, 18C2 etc. and the corresponding diode switch.

Each of the individual connections 221 to 268, two of which are shown in broken line in Fig. 18, is strapped to as many switches TS1, TS2 etc. as are required on the component field. In the example shown in Fig. 18, four diode switches TS2–TS5 are connected to wire 221, and two diode switches TS6 and TS7 to wire 222. As in the case of the diode switches of Fig. 17, because of the pulse shapers providing a —50 volt termination to the component identification wires, the diode switches TS1, TS2 etc. will only strike when pulses received over the send component pulse wires 211–217 coincide with the code ring tube to which the corresponding diode switches TS1, TS2 etc. are connected being in its conducting condition and the pulse from the send component wire will be injected on to the component identification wire to which the diode switch is strapped.

The ten impulses per second generating circuit is shown in Fig. 19. This circuit accepts send pulses (90 impulses per second) transmitted from tube V9 of the main cycle counter (Fig. 10) over lead 159, divides by three (trinary counter) twice and at the second trinary counter triggers three separate pulse shapers to generate a 3 phase 10 impulses per second supply. The trinary counter is an adaptation of the binary counter employed in the main cycle counter (Fig. 10) and for convenience, only the second stage, which is identical with the first, is shown in detail. The incoming 90 impulses per second signal is applied over lead 159 to the suppressor grids of all three tubes E1, E2, E3 not shown in detail, a capacitor is connected to the screen grid of each tube to ensure that the conducting tube goes out does not reconduct when the counter steps, and an anode-grid capacitor ensures that the correct tube comes in when the counter steps. The 30 impulses per second output from the first stage is applied to the suppressor grids of the three second stage tubes E4, E5 and E6 whose circuits include screen grid capacitors 19C1, 19C2 and 19C3 and anode-grid capacitors 19C4, 19C5 and 19C6.

The anodes of the tubes E4, E5 and E6 are connected by wires W, X and Y respectively to the separate 10 impulses per second pulse shaper circuits of which only one, comprising tube E7, is shown. Each pulse shaper drives a cathode follower tube (E10 in the case of pulse shaper E7) which provides 55 volt positive pulses.

(*l*) *Further components and values*

Although certain of the circuit components such as resistors and capacitors in all the figures have been referred to specifically where they perform particular functions, the majority are components requisite to the operation of the circuits as will be well understood by electronic engineers. Tables of values of the resistors and capacitors are given below. It will be seen that the values of resistors in similar positions are not all the same, for example, anode resistors vary from 1 megohm to 22K ohms (K=1000). Again, in some circuits the suppressor grids of several tubes are commoned directly whereas in other circuits the individual suppressor grids are decoupled.

The HT monitor (tubes G10 and G12 of Fig. 15) ensures that if a faulty tube is encountered in the code ring the ring will reset. This means that tubes beyond the faulty one will be missed and therefore the first tube in the ring is the most reliable one, the second tube is the next most reliable and so on. This should be taken into account when allocating codes to the tubes i. e. emergency service should be allocated to the first tube.

VII. TABLES OF APPROPRIATE VALUES

The tables of resistor and capacitor values are as follows:

*Table I (Figure 3)*

| | |
|---|---|
| **R1**=240 ohms | **R32**=4.7 megohms |
| **R2**=400 ohms | **R33**=68K ohms |
| **R3**=15K ohms | **R34**=22K ohms |
| **R4**=22K ohms | **R35**=220K ohms |
| **R10**=150K ohms | **R36**=560K ohms |
| **R6**=56K ohms | **R37**=15K ohms |
| **R7**=56K ohms | **R38**=220K ohms |
| **R8**=56K ohms | **R39**=1 megohm |
| **R9**=470K ohms | **R40**=220K ohms |
| **R10**=150K ohms | **R41**=68K ohms |
| **R11**=100K ohms | **R42**=22K ohms |
| **R12**=560K ohms | **R43**=220K ohms |
| **R13**=1 megohm | **R44**=1 megohm |
| **R14**=3.3 megohms | **R45**=560K ohms |
| **R15**=1K ohms | **R46**=15K ohms |
| **R16**=100 ohms | **R47**=220K ohms |
| **R17**=220K ohms | **R48**=1 megohm |
| **R18**=33K ohms | **R49**=680K ohms |
| **R19**=1K ohms | **R50**=33K ohms |
| **R20**=33K ohms | **R51**=820K ohms |
| **R21**=220K ohms | **R52**=22K ohms |
| **R22**=560K ohms | |
| **R23**=150K ohms | **C1**=0.25 microfarad |
| **R24**=22K ohms | **C2**=0.25 microfarad |
| **R25**=1 megohm | **C3**=0.02 microfarad |
| **R26**=470K ohms | **C4**=0.10 microfarad |
| **R27**=1 megohm | **C5**=0.25 microfarad |
| **R28**=560K ohms | **C6**=0.10 microfarad |
| **R29**=560K ohms | **C7**=2.0 microfarads |
| **R30**=560K ohms | **C8**=0.1 microfarad |
| **R31**=1 megohm | |

*Table II (Figure 4)*

4R1=15K ohms
4R2 to 4R11=220K ohms
4R12 to 4R21=333K ohms
4R22 to 4R32=1 megohm
4R33 to 4R35=15K ohms
44C1=0.005 microfarad
4C2=0.100 microfarad
4C3=0.100 microfarad
4C4 to 4C13=0.005 microfarad
4C14 to 4C23=0.25 microfarad

*Table III (Figure 5)*

5R1=470K ohms
5R2=470K ohms

5R3=33K ohms
5R4 to 5R8=1 megohm
5R9 to 5R12=220K ohms
5R13 to 5R14=33K ohms
5R15=15K ohms 5C=0.02 microfarad
5C1 to 5C10=0.005 microfarad
5C11 to 5C14=0.25 microfarad
5C15 to 5C18=0.005 microfarad

*Table IV (Figure 6)*

6R1=15K ohms
6R2 to 6R22=220K ohms
6R23 to 6R32=1 megohm
6R33 to 6R44=33K ohms
6R45 and 6R46=1 megohm
6R48 to 6R51=470K ohms
6R52 to 6R54=56K ohms
6R55 and 6R56=680K ohms
6R57 and 6R58=330K ohms
6R59 and 6R60=220K ohms
6R61=560K ohms
6R62 to 6R65=100K ohms
6R66 and 6R67=1 megohm
6R68=22K ohms 6C1 to 6C10=0.005 microfarad
6C11 to 6C21=0.25 microfarad
6C22 to 6C30=0.005 microfarad
6C31=0.001 microfarad
6C32 and 6C33=0.100 microfarad
6C34=0.010 microfarad

*Table VII (Figure 9)*

9R1=33K ohms
9R2=10 megohms
9R3=1 megohm
9R4=820K ohms
9R5=1 megohm
9R6=680K ohms
9R7=220K ohms
9R8=270K ohms
9R9=4500 ohms
9R10=560K ohms
9R11 to 9R20=1 megohm
9R21 to 9R26=220K ohms
9R27 to 9R32=33K ohms
9R33 and 9R34=330K ohms
9R35 and 9R36=15K ohms
9R37=250K ohms (variable)
9R38=680K ohms
9R39=100K ohms
9R40=470K ohms
9R41=47K ohms
9R42=150K ohms
9R43=82K ohms
9R44=56K ohms
9R45=4.7K ohms 9C1=0.1 microfarad
9C2=1.0 microfarad
9C3 to 9C9=0.005 microfarad
9C10 to 9C16=0.25 microfarad
9C17=1.0 microfarad
9C18 to 9C20=0.1 microfarad

*Table V (Figure 7)*

7R1=15K ohms
7R2 to 7R15=220K ohms
7R16 to 7R30=1 megohm
7R31 to 7R39=33K ohms
7R40 to 7R43=100K ohms
7R44 to 7R47=1 megohm
7R48 to 7R51=330K ohms
7R52 and 7R53=560K ohms 7C1 to 7C14=0.005 microfarad 7C15 to 7C27=0.25 microfarad
7C28 to 7C30=0.005 microfarad

*Table VI (Figure 8)*

8R1=100K ohms
8R2 to 8R8=1 megohm
8R9 to 8R19=56K ohms
8R20 to 8R23=1 megohm
8R24=220K ohms
8R25 to 8R29=560K ohms
8R30 to 8R35=470K ohms
8R36 to 8R39=330K ohms
8R40=1 megohm
8R41=22K ohms
8R42=680K ohms
8R43 and 8R44=100K ohms 8C1 to 8C4=150 micromicrofarads
8C5=0.25 microfarad
8C6=0.001 microfarad
8C7=0.005 microfarad

*Table VIII (Figure 10)*

10R1 to 10R3=1 megohm
10R4=430K ohms
10R5 and 10R6=470K ohms
10R7 to 10R12=22K ohms
10R13 to 10R17=33K ohms
10R18 and 10R19=1 megohm
10R20 to 10R24=100K ohms
10R25 to 10R30=56K ohms
10R31 and 10R32=120K ohms
10R33 to 10R36=330K ohms
10R37 and 10R38=560K ohms
10R39=56K ohms
10R40=820K ohms
10R41 to 10R44=680K ohms
10R45 and 10R46=150K ohms 10C1 and 10C2=0.005 microfarad
10C3 and 10C4=330.0 micromicrofarad
10C5=33.0 micromicrofarads
10C6 and 10C7=100.0 micromicrofarads

*Table IX (Figure 11)*

11R1 to 11R3=100K ohms
11R4 to 11R6=33K ohms
11R7 and 11R8=22K ohms
11R9 and 11R10=560K ohms
11R11=680K ohms
11R12=150K ohms
11R13 to 11R15=470K ohms
11R16=1.5 megohms
11R17 and 11R18=180K ohms 11C1=56 micromicrofarads
11C2=220 micromicrofarads

*Table X (Figure 12)*

12R1 to 12R4=220K ohms
12R5 to 12R9=100K ohms
12R10=560K ohms
12R11 to 12R14=22K ohms
12R15=10K ohms
12R16 to 12R19=1 megohm
12R20 to 12R25=33K ohms
12R26=22K ohms
12R27 and 12R28=330K ohms
12R29 and 12R30=680K ohms
12R31=56K ohms
12R32=120K ohms 12C1 and 12C2=470 micromicrofarads
12C3=100 micromicrofarads
12C4=330 micromicrofarads
12C5=0.1 microfarad

*Taxle XI (Figure 13)*

13R1 to 13R3=680K ohms

13R4 to 13R7=1 megohm
13R8 and 13R9=470K ohms
13R10=390K ohms
13R11 and 13R12=22K ohms
13R13 and 13R14=33K ohms
13R15=560K ohms

*Table XII (Figure 14)*

14R1=330K ohms
14R2=1 megohm
14R3=270K ohms
14R4=1 megohm
14R5 and 14R6=470K ohms
14R7 and 14R8=560K ohms
14R9 to 14R19=33K ohms
14R20 to 14R24=1 megohm
14R25 to 14R27=560K ohms
14R28 to 14R30=680K ohms
14R31 and 14R32=330K ohms
14R33 and 14R34=270K ohms 14C1=330 micromicrofarads

*Table XIII (Figure 15)*

15R1=330K ohms
15R2=560K ohms
15R3=220K ohms
15R4=100K ohms
15R5=560K ohms
15R6=100K ohms
15R7=470K ohms
15R8 and 15R9=220K ohms
15R10 to 15R13=100K ohms
15R14 and 15R15=33K ohms
15R16 to 15R21=470K ohms
15R22 to 15R31=1 megohm
15R32 to 15R34=560K ohms
15R35 and 15R36=56K ohms
15R37=1.5 megohms
15R38=15K ohms
15R39=150K ohms
15R40 and 15R41=22K ohms
15R42=82K ohms
15R43=330K ohms 15C1=0.25 microfarad
15C2=0.001 microfarad
15C3=0.01 microfarad
15C4=0.001 microfarad
15C5=0.25 microfarad
15C6=0.005 microfarad
15C7=0.001 microfarad
15C8 and 15C9=220 microfarad

*Table XIV (Figure 16)*

16R1=22K ohms
16R2=1 megohm
16R3=10K ohms
16R4 to 16R7=220K ohms
16R8 to 16R10=1 megohm
16R11 to 16R13=22K ohms 16C1=0.25 microfarad
16C2 to 16C5=0.005 microfarad
16C6 to 16C8=0.25 microfarad

*Table XV (Figure 17)*

17R1 to 17R6=1 megohm

17C1 to 17C6=0.001 microfarad

*Table XVI (Figure 18)*

18R1 to 18R7=1 megohm

18C1 to 18C7=0.005 microfarad

*Table XVII (Figure 19)*

19R1 and 19R2=100K ohms
19R3 to 19R5=330K ohms
19R6 to 19R14=1 megohm
19R15 to 19R22=56K ohms
19R23 to 19R25=680K ohms
19R26 and 19R27=470K ohms
19R28=220K ohms
19R29=22K ohms 19C1 to 19C3=0.005 microfarad
19C4 to 19C6=33.0 micromicrofarad
19C7 and 19C8=100 micromicrofarad
19C9=330 micromicrofarad Accompanying Fig. 21 shows schematically the leads interconnecting the several component circuits separately detailed in Figs. 3–20. Figs. 3, 4, and 6 to 19 are shown as blocks designated by circled numerals in Fig. 21, boxes 5A and 5B are each according to Fig. 5 and connected as shown, and boxes 20A–20D are each according to Fig. 20, connected as shown. In Fig. 21, the leads are connected to the blocks in approximately the same marginal locations in which the connections are found in Figs. 3–20, and to facilitate location and tracing of any particular lead mentioned in the text, reference may be had to the following schedule of figure interconnections:

SCHEDULE OF FIGURE INTERCONNECTIONS

| Lead No. | Lead Reference or Circuit Designation | Outgoing from Fig. No. | Incoming to Fig. No. |
|---|---|---|---|
| 101 | CD/N K | 9 | 6 |
| 102–5 | N1–N4 Transfer Gates | 4 | 7 |
| 106 | "B" Gate Control | 4 | 5A |
| 107 | CD/CO OP | 7 | 9 |
| 108 | End of Train Signal | 3 | 4 |
| 109 | Step. Sequ | 6 | 7 |
| 110 | Start of Train Signal | 3 | 4 |
| 111 | "D" Norm. Signal | 3 | 7, 9 |
| 112 | "D" Op. Signal | 3 | 9 |
| 113 | Call Clear Signal | 3 | 9 |
| 114 | Start Wire (Trans.) | 8 | 15 |
| 115 | Demand Wire | 8 | 11 |
| 116 | CD/M Op | 7 | 9 |
| 117 | Coincidence Wire | 5A, 5B, 7 | 8 |
| 118 | Sender Norm. K | 6 | 8 |
| 119 | CD/CO K | 9 | 3 |
| 120 | Sequ. Trans | 7 | 8 |
| 121 | I. D. P. Norm. K | 9 | 6, 7 |
| 122 | Start Sequ. Signal | 4 | 7 |
| 123 | S/C send "O" | 7 | 6 |
| 124 | Incoming Pulses | 3 | 5A, 5B, 20A–D |
| 125 | Translation Gate | 8 | 6, 7 |
| 126 | I. D. P. Start | 6 | 9 |
| 127 | "T" Pulses | 6 | 7 |
| 128 | Start Signal (Reg.) | 3 | 4, 5A, B5, 6, 9, 20A–20D |
| 129 | P. U. Grid Input | 6 | 9 |
| 130 | Sequ. OD K | 7 | 6 |
| 131 | +100 Cont'd (Reg.) | 3 | 4, 5A, 5B, 6, 7, 9, 20A–20D |
| 132–5 | N1–N4 Transfer Pulses | 7 | 20A–20D |
| 136 | "C" Gate Control | 4 | 5B |
| 137 | N1 Gate Control | 4 | 20A |
| 138 | N2 Gate Control | 4 | 20B |
| 139 | N3 Gate Control | 4 | 20C |
| 140 | N4 Gate Control | 4 | 20D |
| 141–150 | Num. Transfer Value Wires | 20 A–20D | 6 |
| 151 | +100 Cont'd. (Trans.) | 15 | 10, 16 |
| 152 | Offer Trigger Control O/T | 11 | 13, 14 |
| 153 | do | 11 | 14 |
| 154 | "C" Pulse to Offer Trigger | 10 | 11 |
| 155 | 1, 440 C. P. S. Phase I | 10 | 12 |
| 156 | Reset Pulse | 10 | 8 |
| 157 | S/C Pulse | 15 | 7, 16 |
| 158 | 1, 440 C. P. S. Phase II | 10 | 11, 13 |
| 159 | Send Pulse | 10 | 13, 19 |
| 160 | "B" Code Pulse | 10 | 17 |
| 161 | "C" Code Pulse | 10 | 17 |
| 162–8 | Sec. Cycle Pulse Wires | 13 | 14 |
| 169 | Trans. Value Wire—DC | 18 | 7 |
| 170 | Trans. Value Wire—CO | 18 | 7 |
| 171–180 | Trans. Value Wires—1 to 0 | 18 | 6 |
| 181–190 | "B" Code Pulse Wires | 17 | 5A |
| 191–200 | "C" Code Pulse Wires | 17 | 5B |
| 201–7 | Offer Components | 14 | 7 |
| 208 | "W" Pulses to Regs | 19 | [1] 6, 9 |
| 209 | "X" Pulses to Regs | 19 | (1) |
| 210 | "Y" Pulses to Regs | 19 | [1] 6, 9 |
| 211–17 | Send Components | 14 | 18 |
| 218 | Offer Trigger Control O/T | 11 | 12 |
| 219 | Step-on Pulse | 12 | 11, 15, 16 |
| 220 | C. C. Anodes to Mon | 16 | 15 |
| 221–268 | 48 Cathode Conn. to Trans. Field. | 16 | 17, 18 |
| 268 | Last Cathode of Code Ring | 16 | 15 |

[1] N. B. Only 2 phases are connected to any 1 Reg.

Having disclosed exemplary embodiments of the novel features and combinations of our invention, we claim:

1. In an automatic telephone exchange apparatus, at least two electronic registers, an electronic translator, and common connecting means between said translator and said registers; said registers each comprising means for electronically storing signals representing dialled in codes and digits; said translator comprising code circuit means constituted by electronic elements each corresponding to a code for which a translation is to be supplied to a register by said translator, a code field comprising a plurality of electronic switching elements related to the codes for which translations are to be supplied, code identification leads, and means for connecting said electronic switching elements to said code circuit means and to said code identification leads; said translator further comprising a translation field comprising a plurality of electronic switch means and translation leads related translationwise to the codes for which translations are to be supplied, and means for connecting said electronic switch means to said code circuit means and to said translation leads; said translator further comprising a source of pulses, a pulse distributor circuit, means for applying pulses from said source to said pulse distributor circuit, means for connecting said pulse distributor circuit to said switching elements for rendering said switching elements sequentially operative and for effecting sequential connection of the distributed pulses to said code identifying leads, and means for signalling to said registers translations from said translation field.

2. Automatic telephone exchange apparatus according to claim 1, in which said code circuit means electronic elements each correspond to a group of codes, said electronic switching elements being respectively connected to all identification leads required to identify the code to be translated.

3. Automatic telephone exchange apparatus according to claim 1 in which each register includes electronic coincidence recording means, means for connecting said recording means to said electronic storage elements in the register for signals representing dialled in codes, gate circuit means in said translator, means for connecting said recording means to said gate circuit means and means for connecting said source of pulses to said gate circuit means.

4. Automatic telephone exchange apparatus according to claim 1 including two sets of said eletronic switching elements for each electronic element in said code circuit and in which the number of elements in one of said sets corresponds to the maximum number of digits in any code designation and the number of elements in the other of said sets is dependent upon the maximum number of items of translation information required in a given code.

5. Automatic telephone exchange apparatus according to claim 1, including means for connecting together the storage elements representing dialled in codes in one register to the corresponding storage elements in all the other registers and also to the translator, and including common control wires for connecting each register to the translator.

6. Automatic telephone exchange apparatus according to claim 1 including means for completely comparing a given sequence of said spaced pulses rendered available on said common connecting means with signals representing codes stored by said storage elements in said registers before the following sequence of spaced pulses is compared with said signals.

7. Automatic telephone exchange apparatus according to claim 1 including means for completely comparing a given sequence of said spaced pulses rendered available on said common connecting means with signals representing codes stored by said storage elements in said registers before the following sequence of spaced pulses is compared with said signals and means for selecting a re-setting pulse from said source of pulses and means for utilising said re-setting pulses to control said comparing means so that each comparison of the translator code circuit with codes stored in the registers is spaced from the next comparison.

8. Automatic telephone exchange apparatus according to claim 1 including means in said registers for providing a signal to the translator when a code for which said registers require information has been offered to them and means in the translator responsive to said signal for rendering available to the register a particular item of information regarding that code before the next item of information regarding that code is rendered available.

9. Automatic telephone exchange apparatus according to claim 8, said signal responsive means comprising means for ensuring that said particular item of information is made available to the register before another element of said code circuit means is connected to said translator.

10. Automatic telephone exchange apparatus according to claim 1 including means in said registers for providing a signal to the translator when the code for which said registers require information has been offered to them, means in the translator responsive to said signal for rendering available to the register a particular item of information regarding that code before the next item of information regarding that code is rendered available, and means responsive to the said signal for temporarily inhibiting the operation of said code circuit so that the translator is enabled to render available to the register the particular item sought.

11. Automatic telephone exchange apparatus according to claim 1 including means in said registers for providing a signal to the translator when the code for which said registers require information has been offered to them, means in the translator responsive to said signal for rendering available to the register a particular item of information regarding that code before the next item of information regarding that code is rendered available, and means responsive to the said signal for temporarily inhibiting the operation of said code circuit so that the translator is enabled to render available to the register the particular item sought, and means for enabling a plurality of registers seeking the same information from the translator to be supplied with the information simultaneously.

12. Automatic telephone exchange system according to claim 1 including means enabling the translator to send to the registers a sequence of interrogating signals for the purpose of establishing which portion of the translation is required, and means in each register responsive to said interrogating signals for selecting a portion of the translation of a particular code upon each presentation thereof by the translator until the said code translation has been received by the register.

13. Automatic telephone exchange system according to claim 1 including means enabling the translator to send to the registers a sequence of interrogating signals for the purpose of establishing which portion of the translation is required, and means in each register responsive to said interrogating signals for selecting a portion of the translation of a particular code upon each presentation thereof by the translator until the said code translation has been received by the register, means in each register for sending a demand signal to the translator in response to an interrogating signal corresponding to an item of a code translation required by a regsiter and which occurs earlier in the offering cycle than the items required by another register, and means responsive to said demand signal for transmitting the required item to the said register at the end of the time allotted to said code.

14. Automatic telephone exchange system according to claim 1 including means enabling the translator to send to the registers a sequence of interrogating signals for the purpose of establishing which portion of the translation is required, and means in each register responsive to said interrogating signals for selecting a portion of the translation of a particular code upon each presentation thereof by the translator until the said code translation has been received by the register, means in each register for sending a demand signal to the translator in response to an interrogating signal corresponding to an item of a code translation required by a register and which occurs earlier in the offering cycle than the items required by another register, means responsive to said demand signal for transmitting the required item to the said register at the end of the time allotted to the said code, means for stopping the code offering sequence after the reception of said required item by the said register, and further means for offering to the register those items of the code translation occurring later than the said required item.

References Cited in the file of this patent

UNITED STATES PATENTS

| | | |
|---|---|---|
| 2,447,494 | Deakin | Aug. 24, 1948 |
| 2,510,061 | Branson et al. | June 6, 1950 |
| 2,512,679 | Ridler | June 27, 1950 |